(12) United States Patent
Takagi

(10) Patent No.: US 6,982,880 B2
(45) Date of Patent: Jan. 3, 2006

(54) FOLDAWAY ELECTRONIC DEVICE AND FLEXIBLE CABLE FOR SAME

(75) Inventor: Hisamitsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 10/766,655

(22) Filed: Jan. 27, 2004

(65) Prior Publication Data

US 2004/0190271 A1 Sep. 30, 2004

Related U.S. Application Data

(62) Division of application No. 10/024,073, filed on Dec. 17, 2001, now Pat. No. 6,738,264, which is a division of application No. 09/614,843, filed on Jul. 12, 2000, now Pat. No. 6,344,977.

(30) Foreign Application Priority Data

Oct. 20, 1999 (JP) ............................................ 11-298803

(51) Int. Cl.
*H04B 1/03* (2006.01)
*H05K 5/02* (2006.01)

(52) U.S. Cl. ...................... 361/814; 361/752; 174/254

(58) Field of Classification Search ......... 361/752–753, 361/755, 757, 814, 818, 682–685; 455/90, 455/575; 174/117 FF, 254, 258; 439/165
See application file for complete search history.

(56) References Cited

U.S. PATENT DOCUMENTS

| 3,613,230 A | 10/1971 | Griff |
| 4,715,928 A | 12/1987 | Hamby |
| 5,479,678 A | 1/1996 | Reed |
| 5,499,444 A | 3/1996 | Doane et al. |
| 5,504,813 A | 4/1996 | Takasaki |
| 5,581,440 A | * 12/1996 | Toedter ..................... 361/683 |
| 5,636,275 A | 6/1997 | Takagi |
| 5,656,796 A | 8/1997 | Marinos et al. |
| 5,910,882 A | 6/1999 | Burrell |
| 6,011,699 A | 1/2000 | Murray |
| 6,052,280 A | * 4/2000 | Dilley et al. ................ 361/687 |
| 6,104,808 A | 8/2000 | Alameh |
| 6,207,901 B1 | 3/2001 | Smith et al. |

FOREIGN PATENT DOCUMENTS

| JP | 03006755 | 11/1994 |
| JP | 6-311216 | 11/1994 |
| JP | 7-131850 | 5/1995 |
| JP | 7-313371 | 12/1995 |
| JP | 8-33027 | 2/1996 |
| JP | 8-125380 | 5/1996 |
| JP | 8-298538 | 11/1996 |
| JP | 9-181803 | 7/1997 |

* cited by examiner

*Primary Examiner*—Kamand Cuneo
*Assistant Examiner*—Tuan Dinh
(74) *Attorney, Agent, or Firm*—Katten Muchin Zavis Rosenman

(57) ABSTRACT

A foldaway electronic device includes a base unit having opposing lateral surfaces and an end portion, a cover unit having opposing lateral surfaces, each of which corresponds to one of the lateral surfaces of the base unit, and an end portion that is rotatably attached to the end portion of the base unit, whereby the cover unit may be rotated between a folded position relative to the base unit and an unfolded position relative to the base unit, a locking mechanism in the base unit and cover unit that locks the cover unit in the folded position, a lock release mechanism in the base unit that releases the locking mechanism when the cover unit is in the folded position, and impelling means in the base unit for impelling the cover unit from the folded position to an unfolded position after the lock release mechanism has been actuated, wherein either lateral surface of the base unit has a guard portion that extends over and prevents contact by a user's thumb and fingers with a portion of the corresponding lateral surface of the cover unit when the cover unit is in the folded position and the lock release mechanism is being actuated.

1 Claim, 20 Drawing Sheets

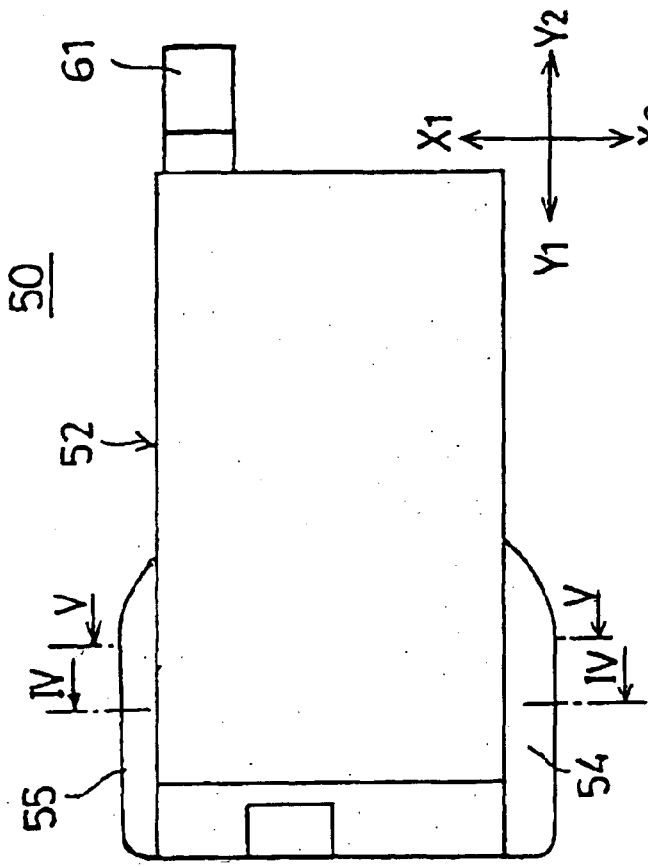
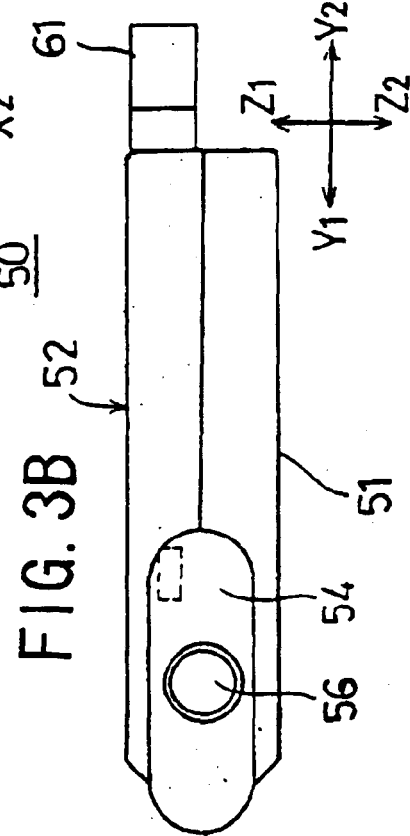
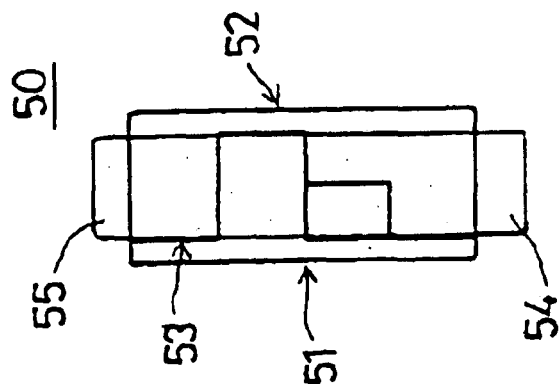

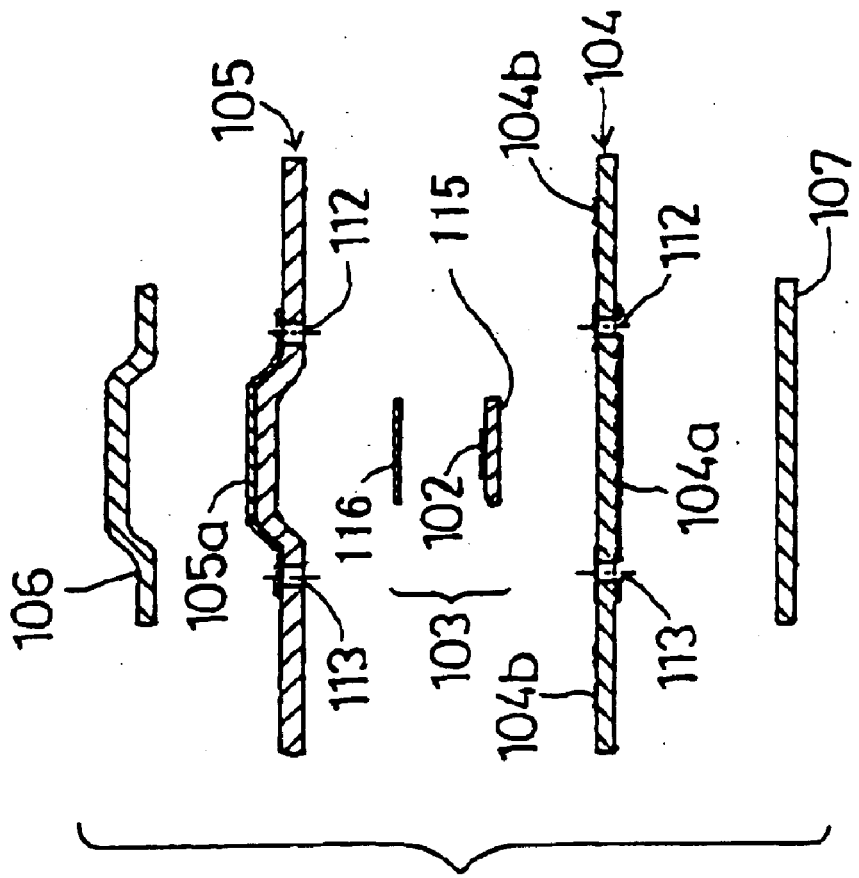
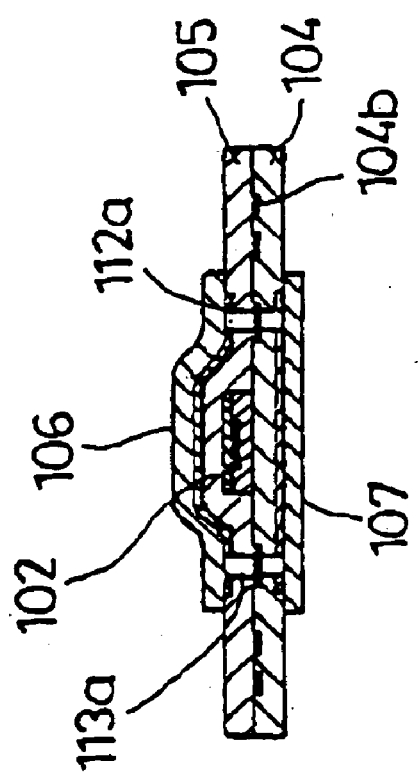
FIG. 13

FOLDAWAY ELECTRONIC DEVICE AND FLEXIBLE CABLE FOR SAME

CROSS-REFERENCE TO RELATED APPLICATION

The present application is a divisional of U.S. application Ser. No. 10/024,073 which was filed on Dec. 17, 2001 now U.S. Pat. No. 6,738,264, which is a divisional of U.S. application Ser. No. 09/614,843 filed on Jul. 12, 2000 now U.S. Pat. No. 6,344,977.

BACKGROUND OF THE INVENTION

1. Field of the Invention

The present invention relates generally to electronic devices and flexible cables for same, and more particularly, to a foldaway portable electronic device such as a communications device and flexible cable configured so that the electronic device is folded when not in use and is opened automatically at the push of a button when in use and communications conducted.

2. Description of the Related Art

In terms of their structure, portable communications devices may be divided into two main types, one capable of being folded and the other, having a generally oblong shape, not capable of being folded. The former type can be further divided into two sub-types, that is, those that are opened manually and those that are opened automatically by pushing a button.

Portable communications devices capable of being folded are markedly more compact in their, folded state than are those portable communications devices which cannot be folded, and so are easy to store and to carry. Also, users of such portable communications devices are often engaged in some other task while using the device, so a construction that allows the user to open the portable communications device using one hand, that is, by the push of a button, is handy and desirable.

FIGS. 1A and 1B show an example of a conventional portable communications device 10 which can be opened automatically. This portable communications device 10 consists of a substantially rectangular key pad base unit 11, a substantially rectangular display cover unit 12, and a hinge 13 that connects the key pad base unit 11 with the display cover unit 12.

The key pad base unit 11 includes operating keys 14 and a microphone 15. The display cover unit 12 has a liquid crystal panel 16 for the display, an antenna 17 and a speaker 18. A hinge module 19 is incorporated inside the hinge 13. The hinge module 19 springingly impels the display cover unit 12 away from the key pad base unit 11. A button 20 is provided near the hinge 13 at a lateral surface 11a of the key pad base unit 11.

Normally, the portable communications device 10 is closed as shown in FIG. 1A, with the display cover unit 12 closed and joined to the key pad base unit 11 by a lock tab 21.

When in use, that is, when conducting communications, the user grasps the foldaway portable communications device 10 by taking the key pad unit 11 in the palm of the left hand 30 and pressing the button 20 with the thumb 31 of the left hand. In so doing, a rotating lever 22 shifts the lock tab 21, causing the lock tab 21 to withdraw and thereby releasing the display unit 12 from the key pad base unit 11. A spring inside the hinge module 19 causes the display unit 12 to rotate away from the key pad base unit 11 and into the unfolded position shown in FIG. 1B. The user then puts the portable communications device 10 to the ear and conducts communications.

However, partly because the portable communications devices like the portable communications device 10 shown in FIGS. 1A and 1B have become more compact, when th user presses the button 20 with the thumb 31 of the left hand 30 a part of the thumb 31 tends to contact a side 12a of the display cover unit 12, while the fingers 32 tend to contact an opposite side 12b of the display cover unit 12.

In such a state, the thumb and fingers contacting the sides 12a, 12b of the display cover unit 12 create resistance against, and thus hamper the smooth opening of, the display cover unit 12.

SUMMARY OF THE INVENTION

Accordingly, it is a general object of the present invention to provide an improved and useful foldaway electronic device and flexible cable for same in which the above-described disadvantage is eliminated.

The above-described object of the present invention is achieved by a foldaway electronic device comprising:

a base unit having opposing lateral surfaces and an end portion;

a cover unit having opposing lateral surfaces, each of which corresponds to one of the lateral surfaces of the base unit, and an end portion that is rotatably attached to the end portion of the base unit, whereby the cover unit may be rotated between a folded position relative to the base unit and an unfolded position relative to the base unit;

a locking mechanism in the base unit and cover unit that locks the cover unit in the folded position;

a lock release mechanism in the base unit that releases the locking mechanism when the cover unit is in the folded position; and impelling means in the base unit for impelling the cover unit from the folded position to an unfolded position after the lock release mechanism has been actuated, wherein either lateral surface of the base unit has a guard portion that extends over and prevents contact with a portion of the corresponding lateral surface of the cover unit by a user's thumb, and fingers when the cover unit is in the folded position and the lock release mechanism is being actuated.

The above-described object of the present invention is also achieved by A foldaway electronic device comprising:

a base unit having opposing lateral surfaces and an end portion;

a cover unit having opposing lateral surfaces, each of which corresponds to one of the lateral surfaces of the base unit, and an end portion that is rotatably attached to the end portion of the base unit, whereby the cover unit may be rotated between a folded position relative to the base unit and an unfolded position relative to the base unit;

a locking mechanism in the base unit and cover unit that locks the cover unit in the folded position;

a lock release mechanism in the base unit that releases the locking mechanism when the cover unit is in the folded position;

impelling means in the base unit for impelling the cover unit from the folded position to an unfolded position after the lock release mechanism has been actuated; and an operating member for operating the lock release mechanism comprising:

a pedestal member provided on a lateral surface of the base unit so as to project beyond a corresponding lateral surface of the cover unit; and a button provided on the pedestal member in such a way that when the button is depressed the pedestal portion prevents contact with a portion of the corresponding lateral surface of the cover unit by a user's thumb when the cover unit is in the folded position and the lock release mechanism is being actuated.

Additionally, the above-described object of the present invention is also achieved by a foldaway electronic device comprising:

a base unit having opposing lateral surfaces and an end portion;

a cover unit having opposing lateral surfaces, each of which corresponds to one of the lateral surfaces of the base unit, and an end portion that is rotatably attached to the end, portion of the base unit, whereby the cover unit may be rotated between a folded position relative to the base unit and an unfolded position relative to the base unit;

a locking mechanism in the base unit and cover unit that locks the cover unit in the folded position;

a lock release mechanism in the base unit that releases the locking mechanism when the cover unit is in the folded position;

impelling means in the base unit for impelling the cover unit from the folded position to an unfolded position after the lock release mechanism has been actuated; and an operating member for operating the lock release mechanism, the operating member being provided on a lateral surface of the base unit, a lateral surface of the cover unit corresponding to the lateral surface of the base unit on which the operating member is provided having a substantially concave shape with respect to the lateral surface of the base unit at least in a vicinity of the operating member.

Additionally, the above-described object of the present invention is also achieved by a foldaway electronic device comprising:

a base unit having opposing lateral surfaces and an end portion;

a cover unit having opposing lateral surfaces, each of which corresponds to one of the lateral surfaces of the base unit, and an end portion that is rotatably attached to the end portion of the base unit, whereby the cover unit may be rotated between a folded position relative to the base unit and an unfolded position relative to the base unit;

a locking mechanism in the base unit and cover unit that locks the cover unit in the folded position;

a lock release mechanism in the base unit that releases the locking mechanism when the cover unit is in the folded position;

impelling means in the base unit for impelling the cover unit from the folded position to an unfolded position after the lock release mechanism has been actuated; and an operating member for operating the lock release mechanism, the operating member being provided on a lateral surface of the base unit, the base unit having a width at least of a portion where the operating member is provided greater than a width of a corresponding portion of the cover unit.

According to the invention described above, the cover unit is not restricted by the thumb and fingers of the user's hand and can thus open smoothly.

The above-described object of the present invention is also achieved by a foldaway electronic device comprising:

a base unit having opposing lateral surfaces and an end portion;

a cover unit having opposing lateral surfaces, each of which corresponds to one of the lateral surfaces of the base unit, and an end portion that is rotatably attached to the end portion of the base unit, whereby the cover unit may be rotated between a folded position relative to the base unit and an unfolded position relative to the base unit;

a locking mechanism in the base unit and cover unit that locks the cover unit in the folded position;

a lock release mechanism in the base unit that releases the locking mechanism when the cover unit is in the folded position;

impelling means in the base unit for impelling the cover unit from the folded position to an unfolded position after the lock release mechanism has been actuated;

an operating member for operating the lock release mechanism, the operating member being provided on a lateral surface of the base unit; and a coaxial-type flexible cable extending between the base unit and the cover unit via the respective end portions thereof, the coaxial-type flexible cable comprising a flexible cable and a coaxial cable laid on and affixed to the flexible cable, the coaxial-type flexible cable being wound within the hinge in such a way as to impel the cover unit apart from the base unit into an unfolded position.

According to the invention described above, the elasticity of that portion of the coaxial flexible cable that forms the loop rotatably impels the cover unit open, supplementing a force supplied by a coil spring to be described later and thus allowing use of a coil spring having a torsional force smaller than usual.

Other objects, features and advantages of the present invention will become more apparent from the following detailed description when read in conjunction with the accompanying drawings.

BRIEF DESCRIPTION OF THE DRAWINGS

FIGS. 3A, 3B and 3C are diagrams showing top, side and rear views, respectively, of the portable communications device shown in FIGS. 2A and 2B;

FIG. 13 is a diagram showing the structure of the coaxial flexible cable shown in FIGS. 12A, 12B and 12C;

DESCRIPTION OF THE PREFERRED EMBODIMENTS

Figure 1A:
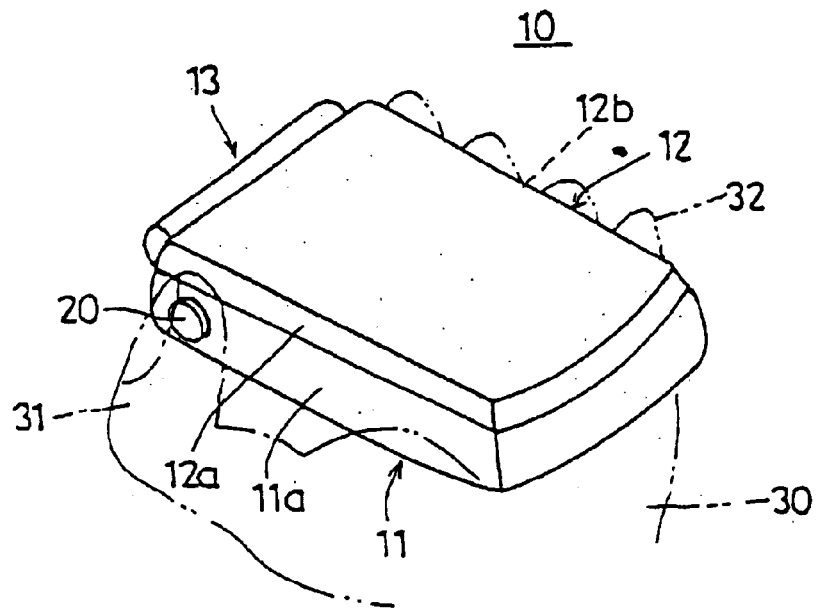
FIGS. 1A and 1B are diagrams showing a conventional foldaway portable communications device in a closed and an unfolded position, respectively.
Figure 1B:
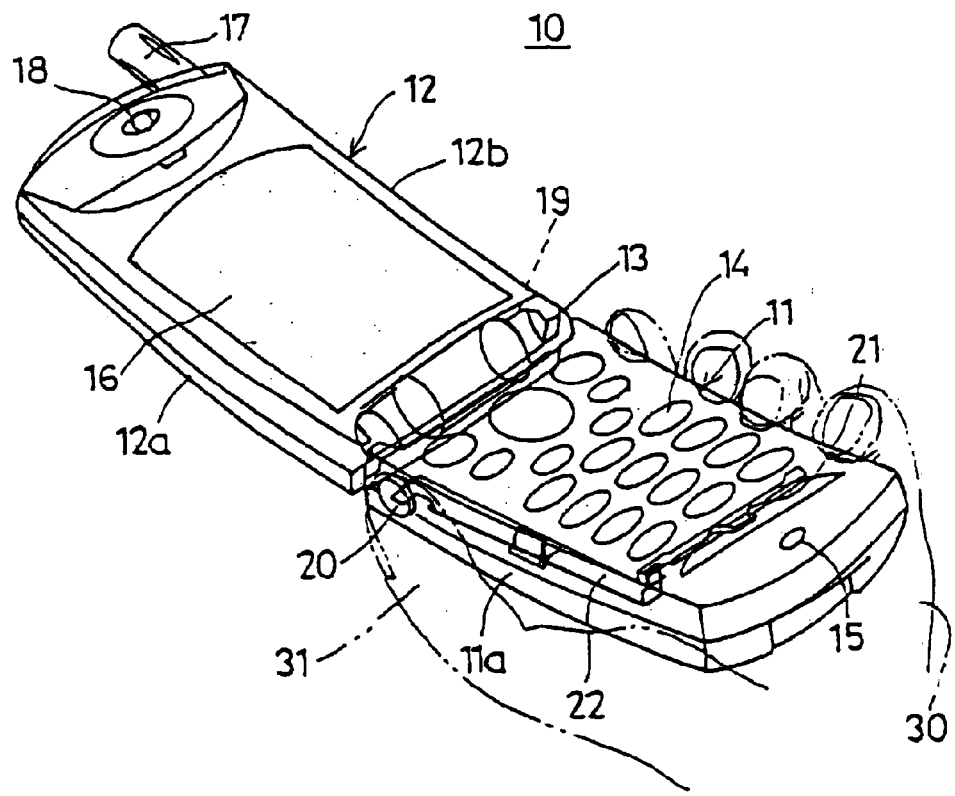

A description will how be given of embodiments of the present invention, with reference to the accompanying drawings.

It should be noted that identical or corresponding elements in the embodiments are given identical or corresponding reference numbers in all drawings, and detailed descriptions thereof are omitted. Moreover, where relevant, for ease of explanation directions in the drawings are given as X1–X2 for the side-to-side direction, Y1–Y2 for front-to-back direction, and Z1–Z2 for the vertical direction.

Figure 2A:
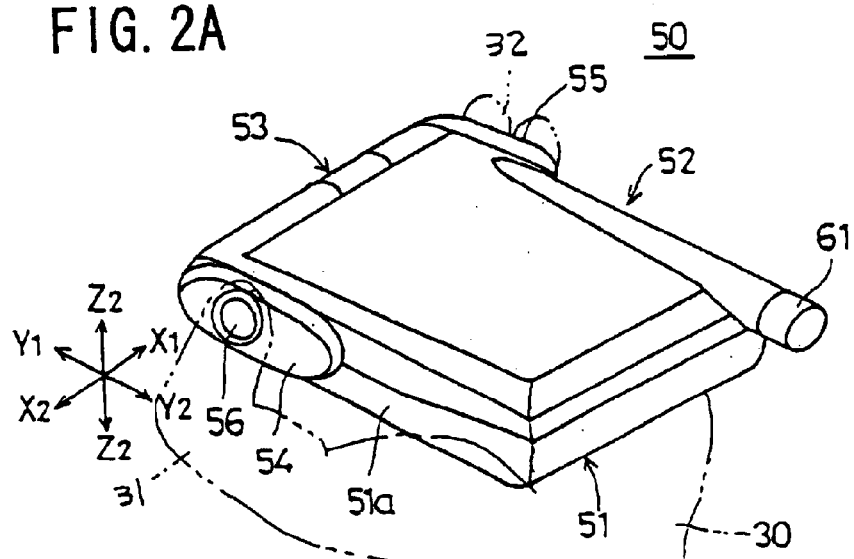
FIGS. 2A and 2B are diagrams showing a foldaway portable communications device according to an embodiment of the present invention in a closed and an unfolded position, respectively.
Figure 2B:
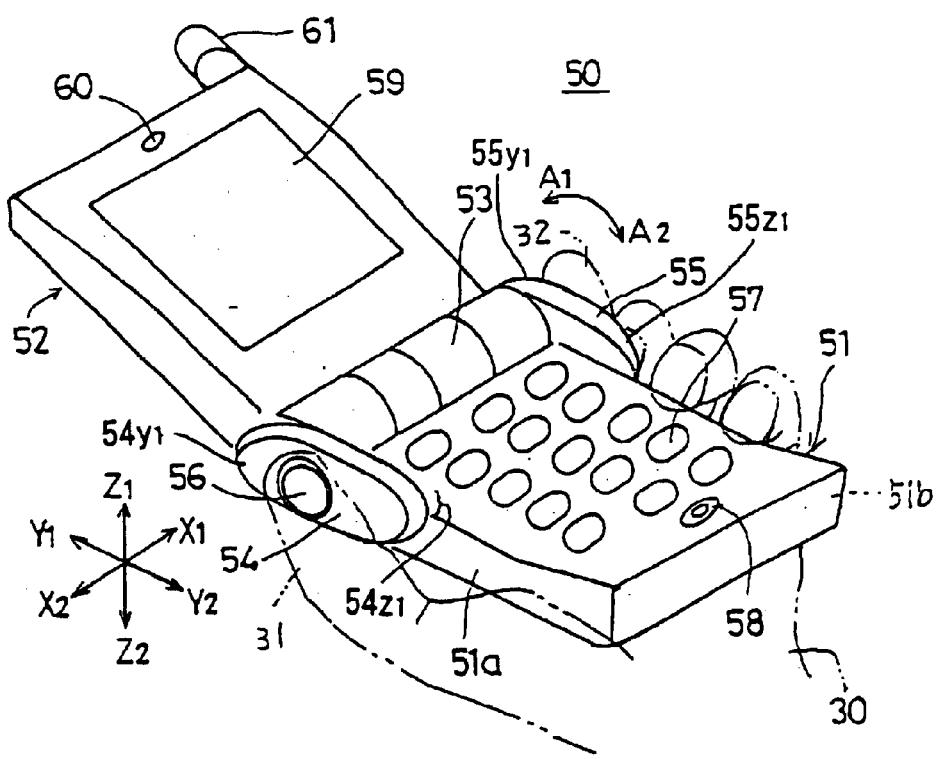

FIGS. 2A and 2B are diagrams showing a foldaway portable communications device according to an embodiment of the present invention in a closed position and an unfolded position, respectively. FIGS. 3A, 3B and 3C are diagrams showing top, side and rear views, respectively, of the portable communications device shown in FIGS. 2A and 2B.

It should be noted that the term "foldaway" as used herein is defined as that which can be folded together for easy storage and portability.

As shown in the diagrams, the foldaway portable communications device 50 has a lock-release button. When the button is pushed the portable communications device 50 automatically opens.

FIGS. 2A, 3A, 3B and 3C show the portable communications device 50 in a folded position. The two-dotted chain lines show the left hand 30 of a user supporting the portable communications device 50 with the latter in a folded position and the user attempting to release the lock and open the portable communications device 50.

FIG. 2B shows a state in which the portable communications device 50 is open for communications, in a state in which the user supports the portable communications device 50 with the left hand 30, indicated by the two-dotted chain line. A hinge 53 lies along the horizontal X1–X2 axis.

As shown in FIGS. 2A, 2B, 3A, 3B and 3C, the portable communications device 50 comprises a substantially rectangular key pad base unit 51, a substantially rectangular display cover unit 52 that is movable with respect to the key pad base unit 51, and a hinge 53 that connects the key pad base unit 51 with the display cover unit 52.

Further, the rectangular key pad base unit 51 has guard portions 54, 55, a lock release button 56, an operating key 57 and a microphone 58. The display cover unit 52 has a liquid crystal panel 59 as a display, an antenna 60 and a speaker 61.

The display cover unit 52 is locked in a folded position to be described later, and, further, is impelled to an unfolded position in a direction away from the key pad base unit 51 by a spring, in a process to be described later.

Normally, the portable communications device 50 is, as shown in FIG. 2A, in a folded position, that is, in a state in which the display cover unit 52 is closed, that is, folded, atop the key pad base unit 51. When the portable communications device 50 is to be used, the user ordinarily supports the portable communications device 50 by the key pad base unit 51 in the left hand 30 and uses the thumb 31 of the left hand to press the lock release button 56. In so doing, the display cover unit 52 is unlocked and a spring disposed inside the hinge 53 rotatably impels the display cover unit 52 away from the key pad base unit 51 in the A1 direction, to the unfolded position shown in FIG. 2B.

Figure 4:
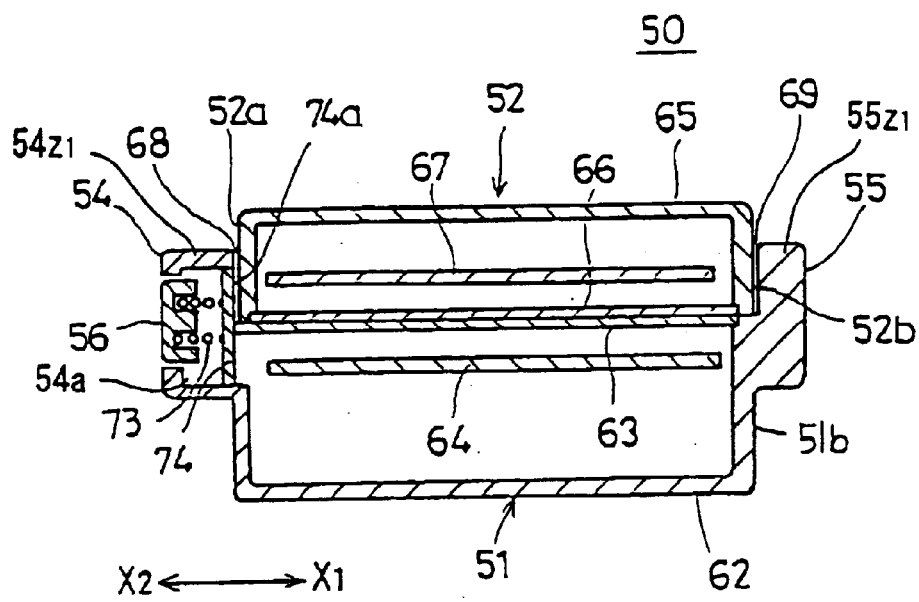
FIG. 4 is a diagram showing a cross-sectional view along a line IV—IV shown in FIG. 3A.
Figure 5:
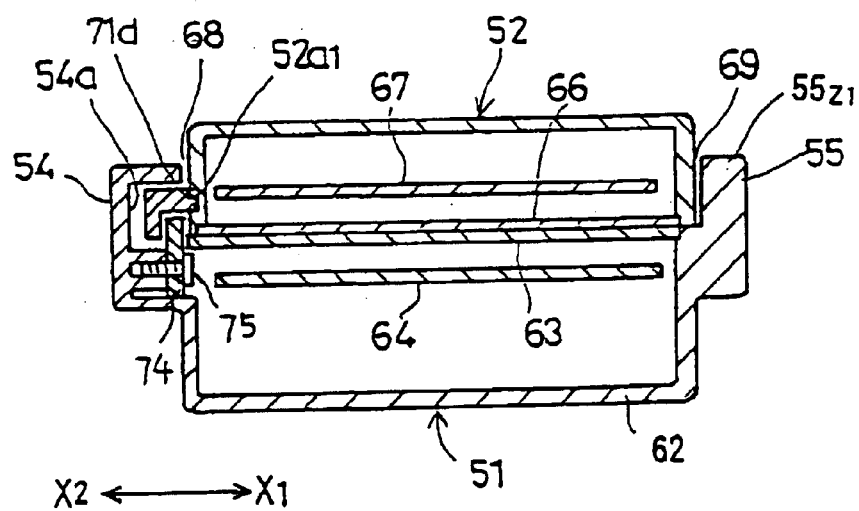
FIG. 5 is a diagram showing a cross-sectional view along a line V—V shown in FIG. 3A.
Figure 6:
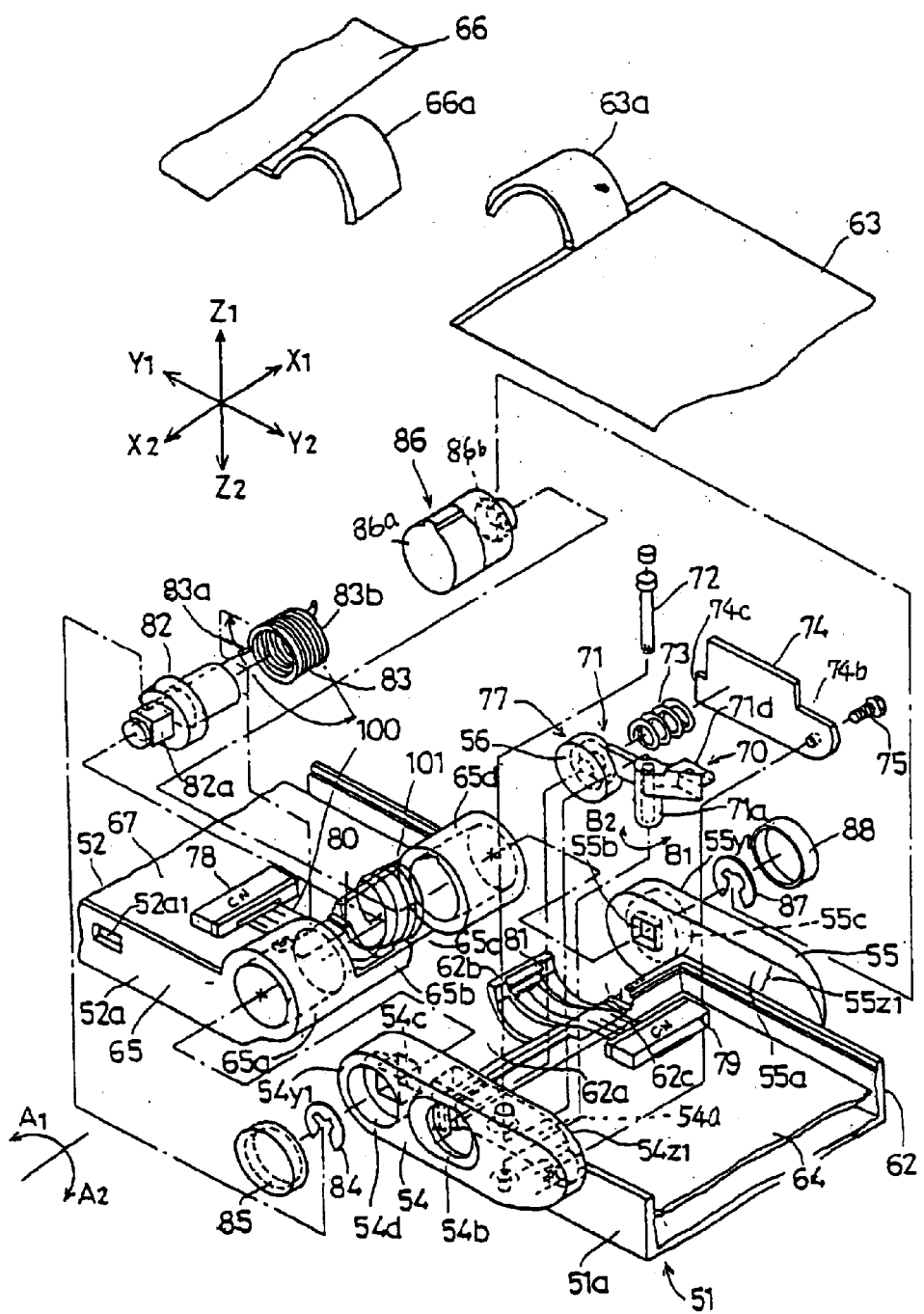
FIG. 6 is a diagram showing an exploded view of the hinge and the lock mechanism of the portable communications device according to an embodiment of the present invention.
Figure 7A:
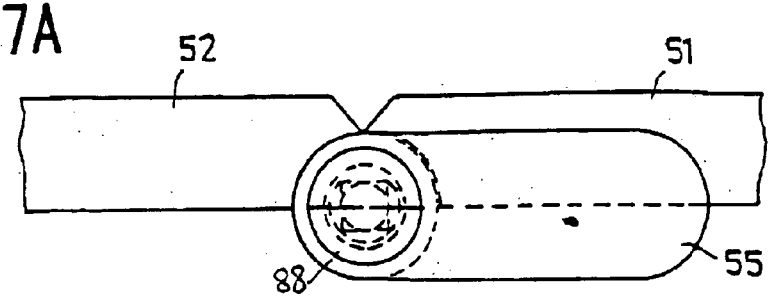
FIGS. 7A, 7B and 7C are diagrams showing side, top and side views, respectively, of the hinge and lock mechanism.
Figure 7B:
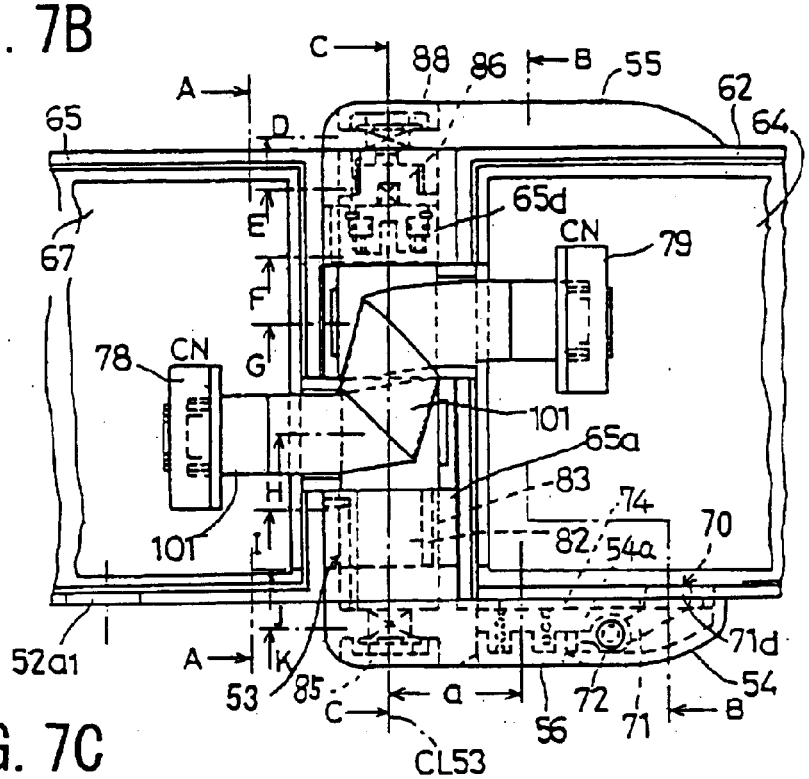
Figure 7C:
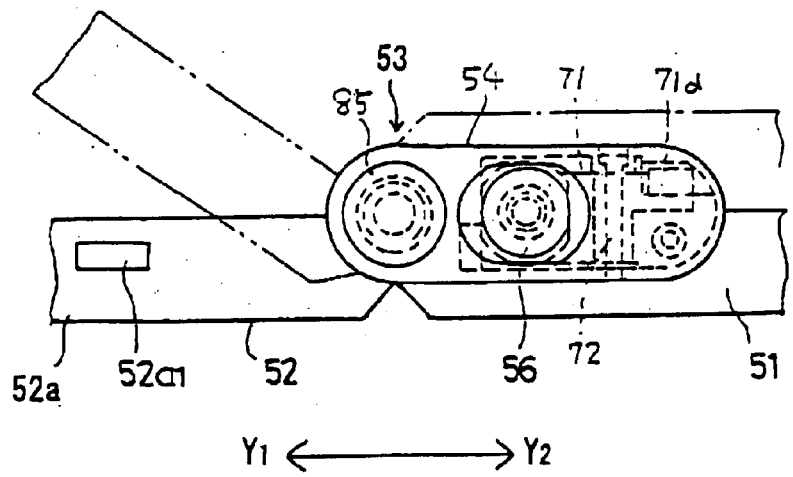
Figure 8A:
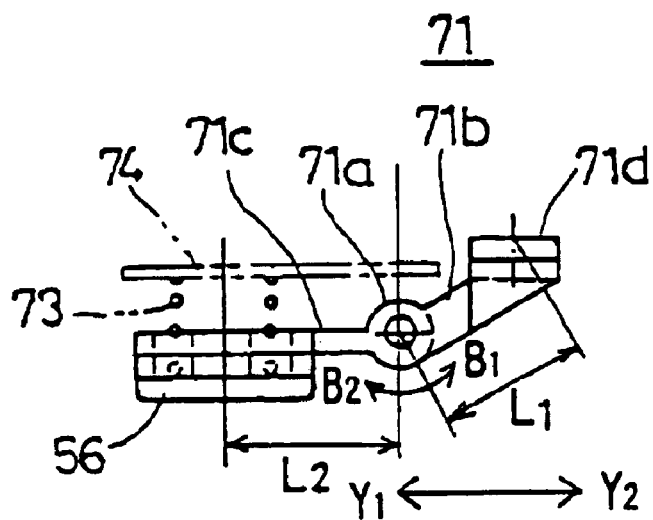
FIGS. 8A, 8B and 8C are diagrams showing top, front and side views, respectively, of the lock member.
Figure 8B:
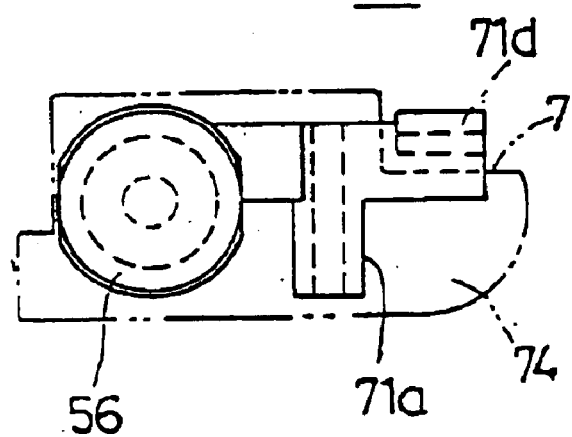
Figure 8C:
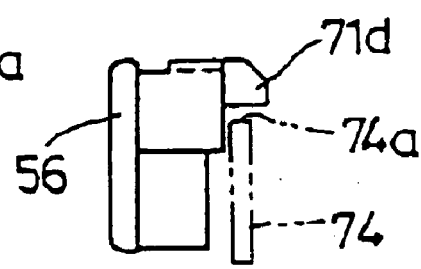
Figure 9C:
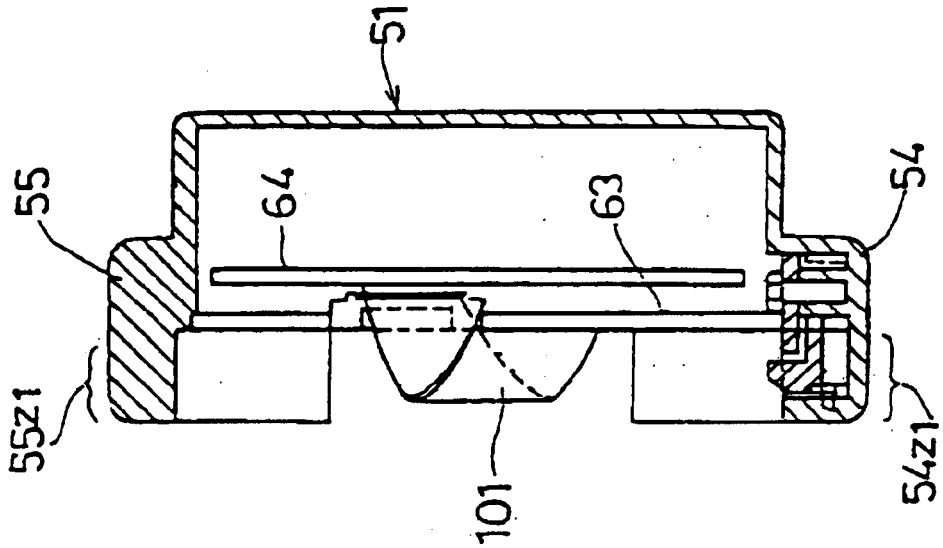
FIGS. 9A, 9B and 9C are diagrams showing cross-sectional views along lines A—A, C—C and B—B shown in FIG. 7B, respectively.
Figure 9B:
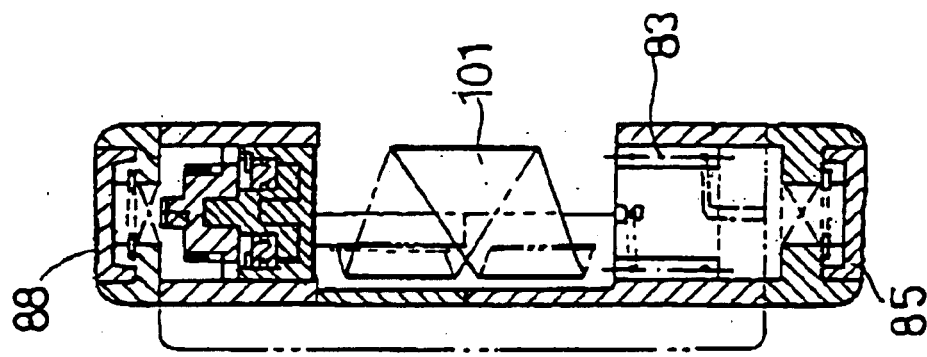
Figure 9A:
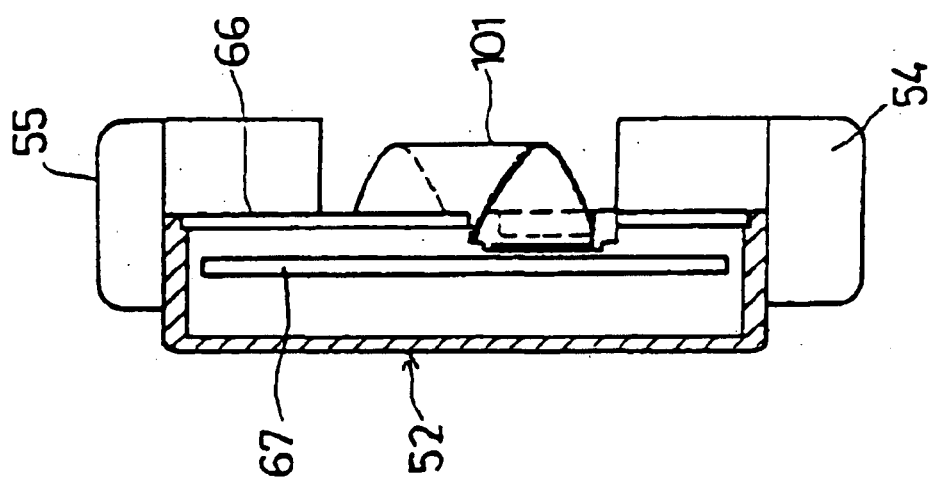
Figure 10A:
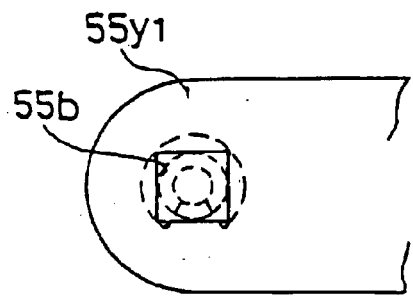
FIGS. 10A, 10B, 10C and 10D are diagrams showing cross-sectional views along lines D, E, F and G as shown in FIG. 7B, respectively.
Figure 10B:
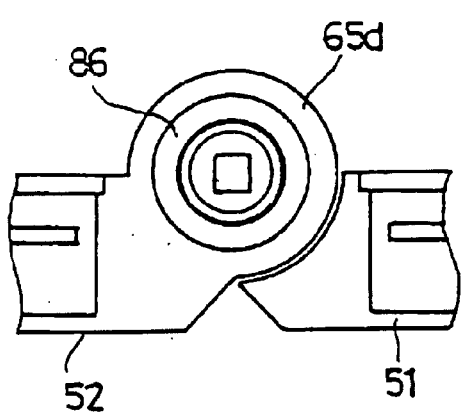
Figure 10C:
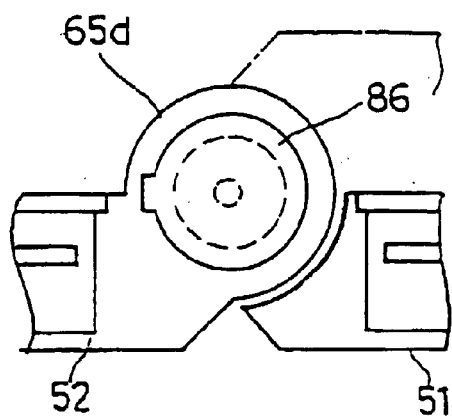
Figure 10D:
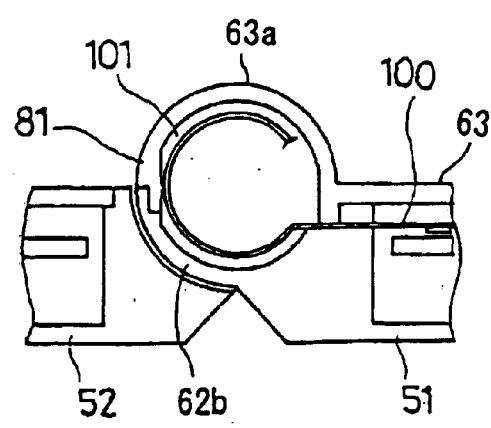
Figure 11A:
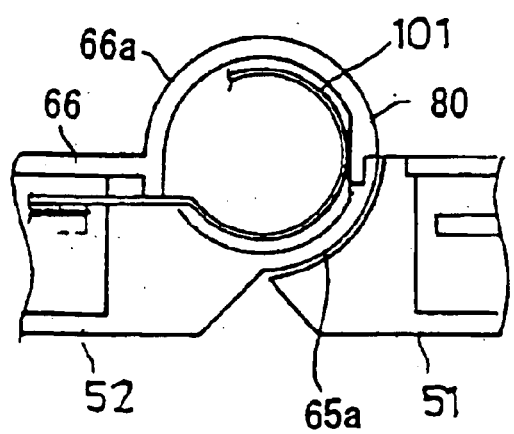
FIGS. 11A, 11B, 11C and 11D are diagrams showing cross-sectional views along lines H, I, J and K as shown in FIG. 7B, respectively.
Figure 11B:
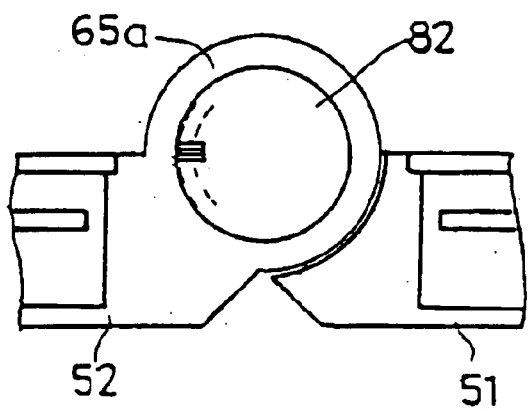
Figure 11C:
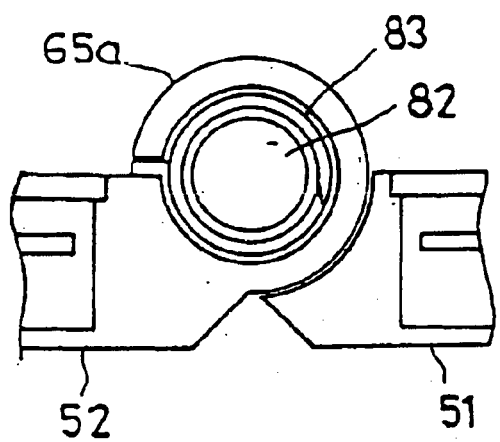
Figure 11D:
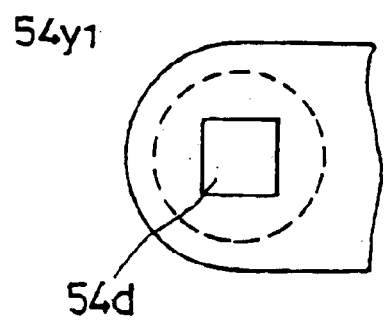

FIG. 4 is a diagram showing a cross-sectional view of the folded closed portable communications device 50 along a line IV—IV shown in FIG. 3A. FIG. 5 is a diagram showing a cross-sectional view of the folded closed portable communications device 50 along a line V—V shown in FIG. 3A. FIG. 6 is a diagram showing an exploded view of the hinge 53 and the lock mechanism of the portable communications device 50 in an unfolded position. FIGS. 7A, 7B and 7C are diagrams showing side, top and side views, respectively, of the hinge 53 and lock mechanism of the portable communications device 50. FIGS. 8A, 8B and 8C are diagrams showing top, front and side views, respectively, of the lock member and the lock release button. FIGS. 9A, 9B and 9C are diagrams showing cross-sectional views along lines A—A, C—C and B—B shown in FIG. 7B, respectively. FIGS. 10A, 10B, 10C and 10D are diagrams showing cross-sectional views along lines D, E, F and G as shown in FIG. 7B, respectively.

It should be noted that the key pad base unit 51 comprises chiefly a substantially box-like housing 62 and a cover 63. A printed circuit board 64 for mounting various electronic parts is mounted within the box-like structure formed by the housing 62 and the cover 63. Similarly, the display cover unit 52 comprises chiefly a box-like housing 65 and a cover 66, with another printed circuit board 67 for mounting various electronic parts contained therein.

A description will now be given of the guard portions 54, 55. This description, where it may reference only one of the two guard portions 54, 55, applies equally to both such guard portions 54, 55.

As shown in FIGS. 2A, 2B, 3A, 3B, 3C, 4, 5, 6, 7A, 7B and 7C, the guard portion 54 is disposed on an X2 lateral surface 51a of the key pad base unit 51 (specifically the housing 62 thereof) so as to project outwardly in the X2 direction from the lateral surface 51*a* of the key pad base unit 51 near the hinge 53, in such a way as to extend above a top surface of the key pad base unit 51 in a Z1 direction as well as beyond a rear edge of the key pad base unit 51 in a Y1 direction. For the sake of descriptive convenience, that part of the guard portion 54 that projects above the top surface of the key pad base unit 51 in a Z1 direction is referred to hereinafter as projecting portion 54*z*1, and, similarly, that part of the guard portion 54 that projects beyond the rear edge of the key pad base unit 51 in a Y1 direction is referred to hereinafter as projecting portion 54*y*1. When the portable communications device 50 is folded closed the projecting portion 54*z*1 covers a portion of an X2 lateral surface 52*a* of the display cover unit 52.

It should be noted that, as will be described in more detail later, an inner lateral surface of the projecting portion 54*z*1 does not contact the lateral surface 52*a* of the display cover unit 52. Instead, as shown for example in FIGS. 4 and 5, a slight gap 68 exists between the inner lateral surface of the projecting portion 54*z*1 and the lateral surface 52*a* of the display cover unit 52.

Likewise, guard portion 55 has a structure identical to that of guard portion 54, though located instead on an X1 lateral surface 51*b* of the key pad base unit 51 (specifically the housing 62), extending in the Z1 and Y1 directions and projecting in the X1 direction as well.

Similarly, that part of the guard portion 55 that projects above the top surface of the key pad base unit 51 in a Z1 direction is referred to hereinafter as projecting portion 55*z*1, and, similarly, that part of the guard portion 55 that projects beyond the rear edge of the key pad base unit 51 in a Y1 direction is referred to hereinafter as projecting portion 55*y*1. When the portable communications device 50 is folded closed the projecting portion 55*z*1 covers a portion of an X1 lateral surface 52*b* of the display cover unit 52.

Additionally, similarly, it should be noted that, as will be described in more detail later, an inner lateral surface of the projecting portion 55*z*1 does not contact the lateral surface 52*b* of the display cover unit 52. Instead, as shown for example in FIGS. 4 and 5, a slight gap 69 exists between the inner lateral surface of the projecting portion 55*z*1 and the lateral surface 52*b* of the display cover unit 52.

It should be noted that the key pad base unit 51 has a width at the location of the guard portions 54, 55 that is wider than a width of the display cover unit 52 at the same location. It should be further noted that the width dimensions mentioned here run in the X1–X2 direction, parallel to the hinge 53.

As a result, the guard portion 54 keeps the user's thumb 31 from contacting the lateral surface 52*a* of the display cover unit 52 when the user takes the folded portable communications device 50 into the left hand 30, supports the portable communications device 50 by the key pad base unit 51 and presses the lock release button 56 with the thumb 31 of the left hand 30 in order to activate the portable communications device 50 and establish communications. The other guard portion 55 similarly prevents the fingers 32 of the left hand 30 from contacting the lateral surface 52*b* of the display cover unit 52 on the opposite side 55. Accordingly, the display cover unit 52 can unfold and open without being restricted by the thumb and fingers 31, 32 of the user and can thus open smoothly.

A description will now be given of a lock mechanism 70 and a lock release operating mechanism 77. The two parts are intimately related and thus will be described not separately but in tandem.

FIG. 6 shows an exploded view of the hinge and the lock mechanism 70 of the portable communications device according to an embodiment of the present invention. FIGS. 7A, 7B and 7C are diagrams showing side, top and side views, respectively, of the hinge 53 and lock mechanism 70. FIGS. 8A, 8B and 8C are diagrams showing top, front and side views, respectively, of the lock release button member 71 which forms a part of the lock mechanism 70.

As shown in the diagrams, an interior of the guard portion 54 on the lateral surface 51*a* on the X2 side of the key pad base unit 51 comprises an empty space 54*a*. The interior space 54*a* is utilized to insert and provide the lock mechanism 70 and the lock release operating mechanism 77.

More specifically, the interior space 54*a* contains the lock release button member 71, a shaft 72, a compression coil spring 73 and a cover member 74 as shown in FIGS. 8A, 8B and 8C.

The cover member 74 is engaged between the key pad base unit 51 and the guard portion 54 and fixedly mounted by a screw 75 on the Y2 edge thereof, thus covering an opening on the X1 side of the interior space 54*a* of the guard portion 54.

The lock release button member 71 itself comprises a bearing 71*a*, arms 71*b* and 71*c* extending from both ends of the bearing 71*a*, a hook 71*d* at a tip end of arm 71*b*, and the lock release button 56 at a tip end of arm 71*c*.

The lock release button member 71 is supported on the bearing 71*a* by a vertical shaft 72 in the guard portion 54 and extends in the Y1–Y2 lateral direction. The lock release button 56 engages an opening 54*b* in a lateral surface of the guard portion 54 and exposed externally. The hook 71*d* projects outward in the X1 direction beyond a notched portion 74*b* formed in the cover member 74. The lock release button member 71 is impelled by the compression coil spring 73 in a B1 direction as shown in FIG. 6.

It will be appreciated that the lock release button 56 is positioned not concentrically with a hypothetical axis CL53 of the hinge 53 but at a position offset from such axis CL53 by a distance "a" in the forward Y2 direction, so as to be disposed not on but near the hinge 53.

The hook 71*d* is positioned slightly above a top surface of the key pad base unit 51, and, as previously mentioned, projects outward in the lateral X1 direction so as to engage a concavity 52*a*1 formed in the lateral surface 52*a* of the display cover unit 52, the concavity 52*a*1 disposed opposite the hook 71*d* when the portable communications device is folded closed. The engagement of the hook 71*d* with the concavity 52*a*1 locks the display cover unit 52 to the key pad base unit 51 in a folded position such as that shown, for example, in FIG. 2A.

When the lock release button 56 is pressed, the lock release button member 71 is rotated in the direction of arrow B2 and the hook 71*d* is thus drawn into the interior space 54*a* and away from the concavity 52*a*1, thus releasing the lock on the display cover unit 52 and thereby permitting the display cover unit 52 to swing open for use.

The lock mechanism 70 has the arm-like lock release button member 71 and therefore has a relatively unwieldy structure. Nevertheless the interior space 54*a* enclosed within the guard portion 54 accommodates the lock mechanism 70, so the compactness of the portable communications device 50 is not affected.

The lock release button member 71*d*, the concavity 52*a*1 in the display cover unit 52 and the compression coil spring 73 together form the lock mechanism 70.

The lock release button member 71 bearing 71a, the arms 71b, 71c extending from both ends of the bearing 71a, and the lock release button 56 provided at the tip of the arm 71c together form the lock release operating mechanism 77.

A description will now be given of the hinge 53, with reference to FIGS. 6, 9A, 9B, 9C, 10A, 10B, 10C, 10D, 11A, 11B, 11C and 11D.

FIGS. 9A, 9B and 9C are diagrams showing cross-sectional views along lines A—A, C—C and B—B shown in FIG. 7B, respectively. FIGS. 10A, 10B, 10C and 10D are diagrams showing cross-sectional views along lines D, E, F and G as shown in FIG. 7B, respectively. FIGS. 11A, 11B, 11C and 11D are diagrams showing cross-sectional views along lines H, I, J and K as shown in FIG. 7B, respectively.

As shown in the diagrams, the housing 65 of the display cover unit 52 is shaped at the location of the hinge 53 in such a way as to have, in order from the X2 side to the X1 side thereof, a cylindrical portion 65a, a semi-cylindrical portion 65b, a notched portion 65c and another cylindrical portion 65d. The housing 62 of the key pad base unit 51 is shaped at the location of the hinge 53 in such a way as to have, in order from the X2 side to the X1 side thereof, a projecting portion 54y1, a notched portion 62a, a semi-cylindrical portion 62b, a notched portion 62c, and a projecting portion 55y1.

The cylindrical portion 65a and the semi-cylindrical portion 65b engage the notched portion 62a, the semi-cylindrical portion 62b engages the notched portion 65c and the cylindrical portion 65d engages the notched portion 62c. Additionally, the semi-cylindrical portion 66a of the cover 66 is disposed opposite and corresponds to semi-cylindrical portion 65b, the two semi-cylindrical portions 66a and 65b together forming a cylindrical portion 80. Similarly, the semi-cylindrical portion 63a of the cover 63 is disposed opposite semi-cylindrical portion 62b, the two semi-cylindrical portions 63a and 62b together forming a cylindrical portion 81. The cylindrical portions 80, 81 thus formed are adjacent to and abut each other.

A shaft member 82 engaging a torsion coil spring 83 is disposed inside the cylindrical portion 65a. A squared portion 82a of the shaft member 82 engages a squared aperture 54c formed in the projecting portion 54y1. The torsion coil spring 83 engages the shaft member 82 and is contained within the interior of the cylindrical portion 65a, the X2 end 83a of the torsion coil spring 83 being engaged by the shaft member 82 and the X1 end 83b of the torsion coil spring 83 being twisted in a clockwise direction as viewed looking toward the X1 side and engaged by an inside of the cylindrical portion 65a. An E-shaped washer 84 is fixedly engaged at the tip of the squared portion 82a of the shaft member 82. A cap 85 is fixedly engaged to an aperture 54d of the projecting portion 54y1.

A damper unit 86 is provided inside the cylindrical portion 65d, with a case 86a of the damper unit 86 being fixedly mounted to the cylindrical portion 65d. A squared shaft portion 86b of the damper unit 86 engages and is secured by a square aperture 55b formed in the projecting portion 55y1. An E-shaped washer 87 is fixedly engaged at the tip of the squared portion 86a of the shaft member 86. A cap 88 is fixedly engaged to an aperture 55c of the projecting portion 55y1.

When the portable communications device 50 is folded closed as shown, for example, in FIGS. 2A and 3, the torsion coil spring 83 is twisted and the display cover unit 52 is impelled by the force of the torsion coil spring 83 in an A1 direction, that is, away and apart from the key pad base unit 51. Accordingly, when the lock release button 56 is pressed and the lock is released, the force of the torsion coil spring 83 attempting to resume its original shape rotates the display cover unit 52 in the A1 direction. At this time, the damper unit 86 causes the display cover unit 52 to open slowly, cushioning the shock when the display cover unit 52 reaches the final open position shown in FIG. 2B.

Additionally, a coaxial-type flexible cable 100 extends through the hinge 53, and is connected at one end thereof to one connector 78 and at the other end thereof to another connector 78.

Accordingly, the printed circuit board 67 inside the display cover unit 52 and the printed circuit board 64 inside the key pad base unit 51 are electrically connected.

Additionally, at the hinge 53 a coaxial flexible cable 100 is disposed in such a way that, when viewed from the display cover unit 52 toward the key pad base unit 51 from the X2 side, the coaxial flexible cable 100 forms a counter-clockwise wound loop 101. The loop 101 in the coaxial flexible cable 100 is accommodated within the adjacently positioned cylindrical portions 80, 81 described above. The elasticity of that portion of the coaxial flexible cable 100 that forms the loop 101 rotatably impels the display cover unit 52 to open in the A1 direction with respect to the key pad base unit 51. In other words, the loop 101 formed by the coaxial flexible cable 100 at the location of the hinge 53 supplements the torsional spring force of the torsion coil spring 83.

Accordingly, a coil spring having a torsional force smaller than usual by an amount equal to the supplementary rotational force supplied by the coaxial flexible cable 100 as described above is used for the torsion coil spring 83.

A description will now be given of the coaxial flexible cable 100 described above.

Figure 12A:
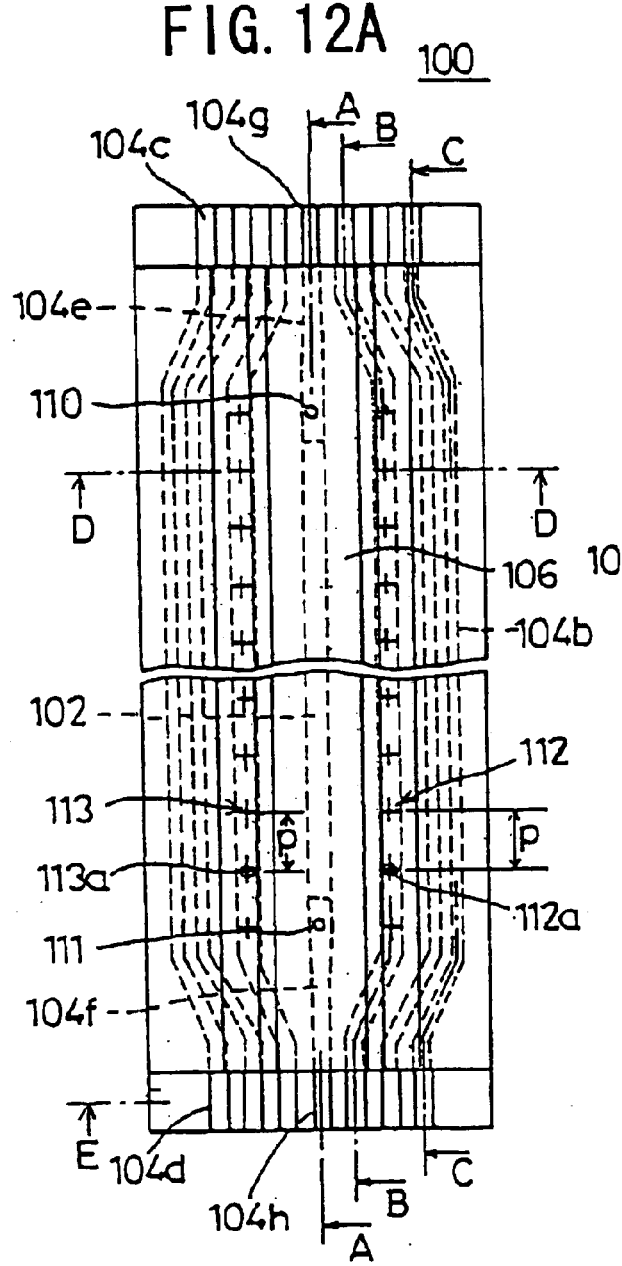
FIGS. 12A, 12B and 12C are diagrams showing top, side and rear views of a coaxial flexible cable according to an embodiment of the present invention.
Figure 12B:
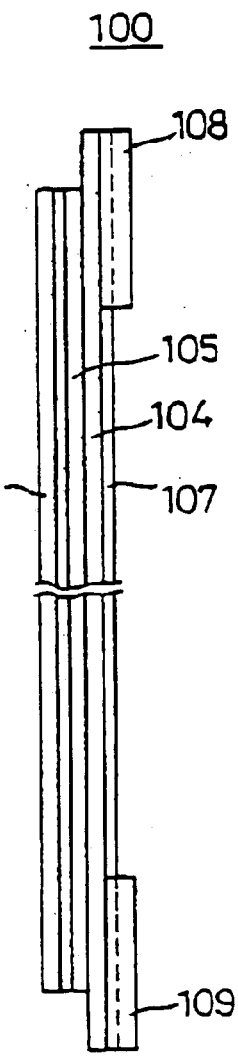
Figure 12C:
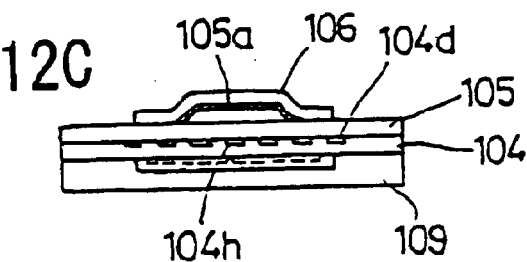
Figure 14A:
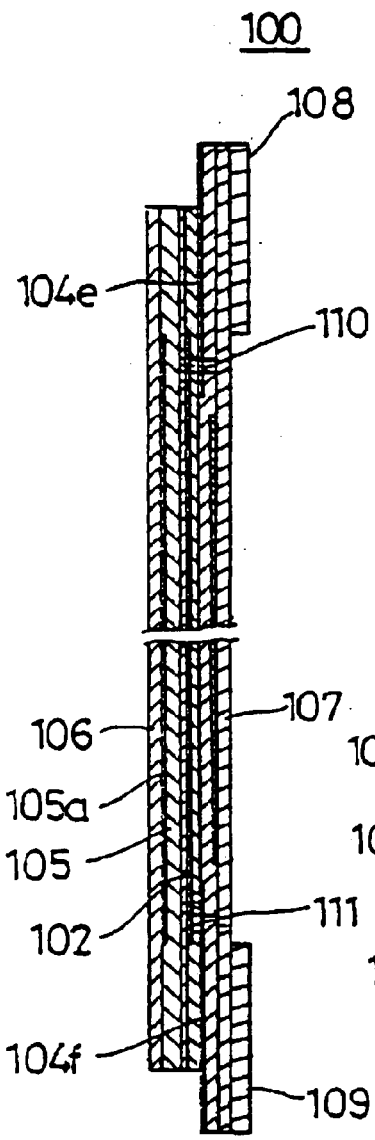
FIGS. 14A, 14B, 14C and 14D are diagrams showing cross-sectional views along lines A, B, C and F, respectively.
Figure 14B:
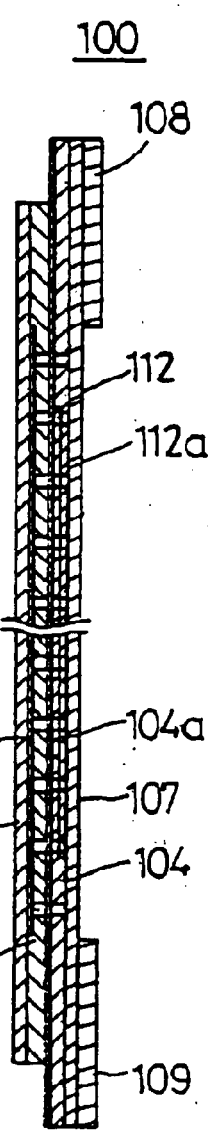
Figure 14C:
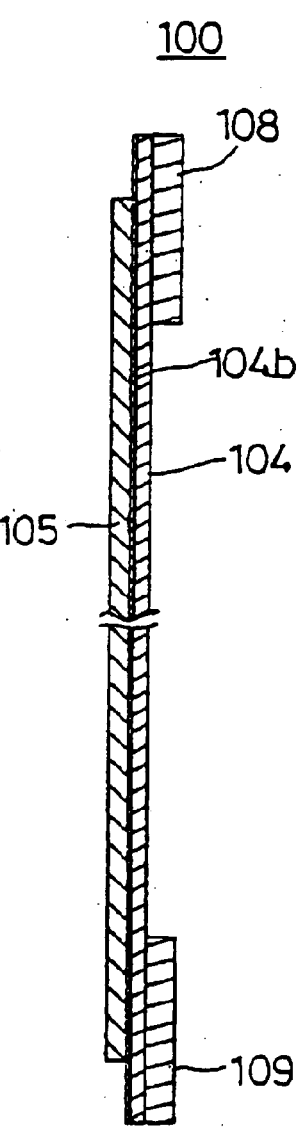
Figure 14D:
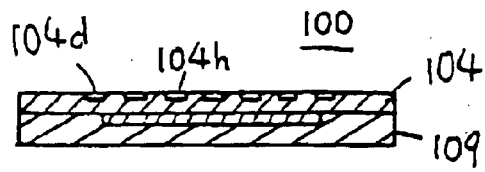

FIGS. 12A, 12B and 12C are diagrams showing top, side and rear views of a coaxial-type flexible cable according to an embodiment of the present invention. FIG. 13 is a diagram showing the structure of the coaxial-type flexible cable shown in FIGS. 12A, 12B and 12C.

The coaxial-type flexible cable 100 is of a spacer insertion type, comprising a spacer 103 having an inner conductor pattern 102 at a center thereof, the spacer 103 being sandwiched between and enveloped by a base 104 beneath the spacer 103 and a top cover layer 105 above the spacer 103. An upper cover 106 lies atop the top cover layer 105 and a lower cover 107 covers the base 104. Reinforcement plates 108, 109 are positioned at either end for added strength.

The spacer 103 comprises a bottom spacer 115 (with the inner conductor pattern 102 disposed on a top surface of the bottom spacer 115) and a top spacer 116 disposed atop the bottom spacer 115.

A ribbon pattern 104a is provided at a center portion of a bottom surface of the base 104. A plurality of signal transmission patterns 104b are provided along both sides of a top surface of the base 104. Each signal transmission pattern 104b has terminals 104c, 104d at either end. Additionally, inner conductor patterns 104e, 104f are formed along both sides of a center portion of the base 104. Each of the inner conductor patterns 104e, 104f has terminals 104g, 104h at ends thereof.

The top cover layer 105 has a ribbon pattern 105a on a center portion of a top surface thereof. The top cover layer 105 has a width identical to that of the base 104 and covers the spacer 103, the inner conductor patters 104e, 104f and the signal transmission pattern 104b.

As described above, the spacer 103 is vertically sandwiched between and enveloped by the base 104 and the top cover layer 105. In such a state, the inner conductor pattern 102 and the inner conductor pattern 104e are connected to each other via a through-hole 110, and the inner conductor pattern 102 and the inner conductor pattern 104f are connected to each other via a through-hole 111. Additionally, as shown in the diagrams, lines of through-holes 112, 113 are provided along both sides of the inner conductor pattern 102. The line of through-holes 112 comprises a plurality of through-holes 112a aligned at a pitch "p" that communicate with the top cover layer 105 and the base 104 so as to electrically connect ribbon pattern 105a and ribbon pattern 104a. Similarly, the line of through-holes 113 comprises a plurality of through-holes 113a aligned at a pitch "p" that communicate with the top cover layer 105 and the base 104 so as to electrically connect ribbon pattern 105a and ribbon pattern 104a. The pitch "p" is determined by the frequency of the high-frequency signals transmitted via the inner conductor pattern 102, and is a sufficiently small value so that electromagnetic radiation does not leak from a space between adjacent through-holes 112a, 113a.

The upper cover layer 106 covers the ribbon pattern 105a formed on the top cover layer 105. The lower cover layer 107 covers the ribbon pattern 104a formed on the base 104.

As shown in FIG. 12B, one synthetic resin reinforcement plate 108 is fixedly mounted on a bottom surface of one-end of the base 104 so as to strengthen terminals 104c, 104g, with the other synthetic resin reinforcement plate 109 fixedly mounted on the bottom surface of the other end of the base 104 so as to strengthen terminals 104d, 104h.

The individual patterns described above may be made of copper. The top spacer 116 may be made of polytetrafluoroethylene. The base 104, the top cover layer 105, the upper cover layer 106, the lower cover layer 107 and the bottom spacer 115 may all be made of polyamideimide.

The inner conductor patterns 102, 104e, 104f together form an inner conductor. The top spacer 116, the bottom spacer 115 and those portions of the base 104 and the upper cover layer 105 disposed opposite the spacers 116, 115 together form an internal insulator. The ribbon patterns 105a, 104a and through-hole lines 112, 113 together form an outer conductor. The upper cover 106 and the lower cover 107 together form an outer insulator.

As shown in FIG. 6, the coaxial flexible cable 100 described above is connected at both ends to connectors 78, 79 and included within the portable communications device 50, with high-frequency signals transmitted through the inner conductor patterns 102, 104e, 104f from antenna 61. The flexible cable 100 is of coaxial construction, so electromagnetic radiation is prevented from leaking from the coaxial flexible cable 100.

A description will now be given of a portable communications device 50A according to a second embodiment of the present invention.

Figure 15A:
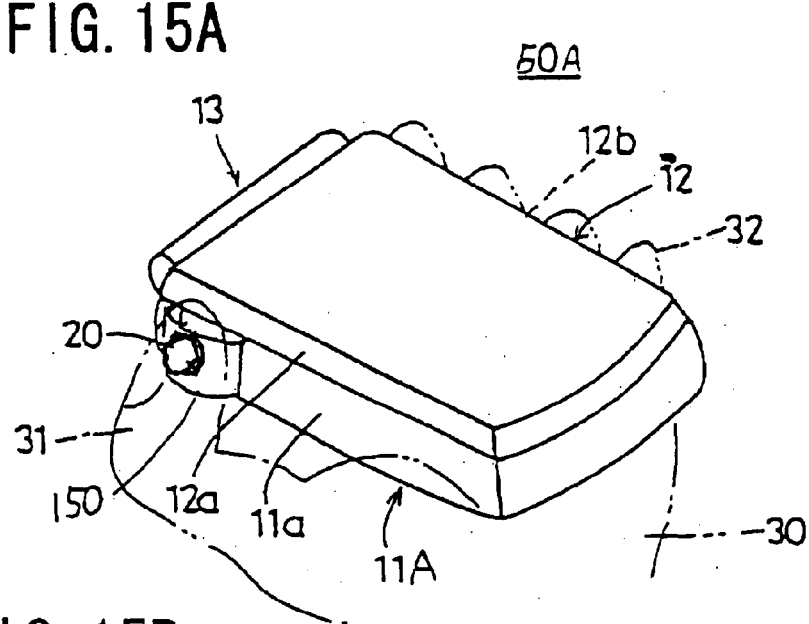
FIGS. 15A and 15B are diagrams showing a foldaway portable communications device according to a second embodiment of the present invention, in a closed and an unfolded position, respectively.
Figure 15B:
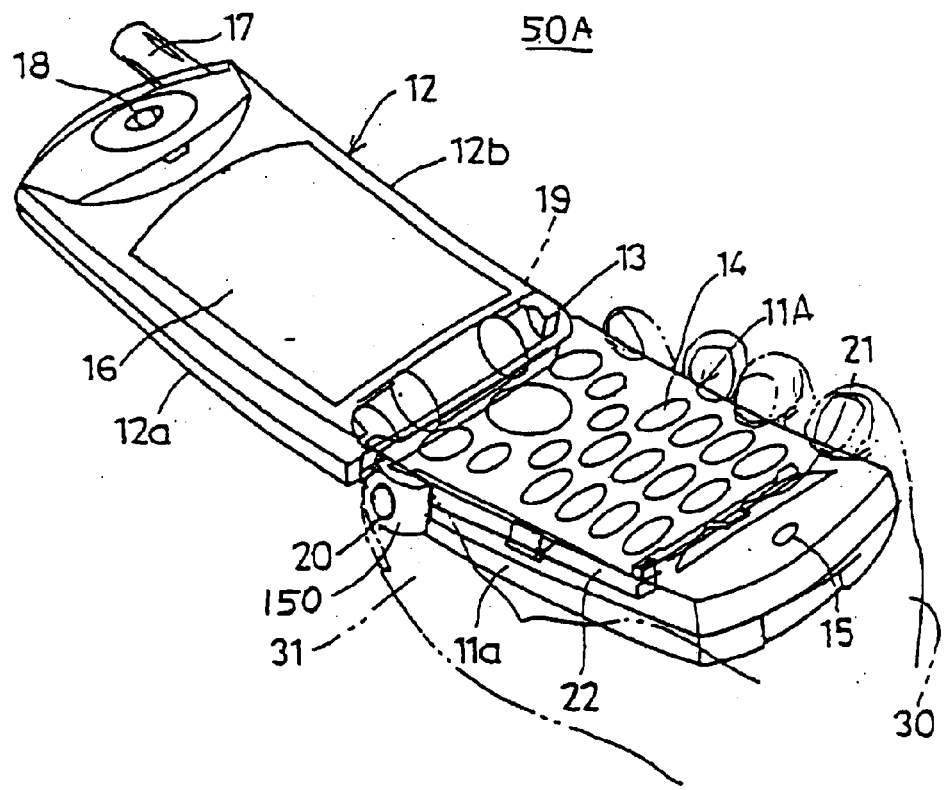

FIGS. 15A, 15B are diagrams showing a foldaway portable communications device 50A according to a second embodiment of the present invention, in a closed and an unfolded position, respectively.

As shown in the diagrams, the chief difference between the portable communications device 50 according to the first embodiment and the portable communications device 50A according to the second embodiment is that the latter is provided with a projection 150 near a hinge 13, with the lock release button 20 provided on the projection 150. The projection 150 is formed in such a way as to project outward from a lateral surface 12a of the display cover unit 12.

It should be noted that the key pad base unit 11A has a width in the vicinity of the lock release button 20 that is greater than a corresponding width of the display cover unit 12.

FIG. 15A shows a state in which the portable communications device 50A is folded closed. The double dot and chain line shows the outline of the left hand 30, with which the user supports the portable communications device 50A and which, by using the thumb 31 of the left hand, the user releases the lock and opens the portable communications device 50A. FIG. 15B shows the portable communications device 50A in an unfolded position.

It will be appreciated that the button 20 is provided on the projection 150, so when the user presses the button 20 with the left thumb 31 that part of the thumb 31 that exceeds the dimensions of the button 20 merely hits the projection 150 instead, without contacting the lateral surface 12a of the display cover unit 12. Accordingly, the display cover unit 12 swings open smoothly, without being hampered by contact with the user's thumb 31.

A description will now be given of a portable communications device 50B according to a third embodiment of the present invention.

Figure 16A:
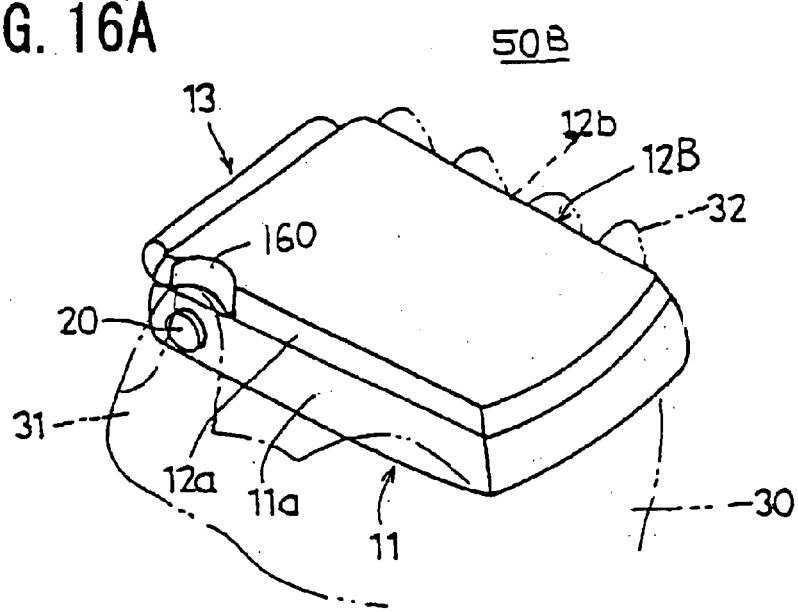
FIGS. 16A and 16B are diagrams showing a foldaway portable communications device according to a second embodiment of the present invention, in a closed and an unfolded position, respectively.
Figure 16B:
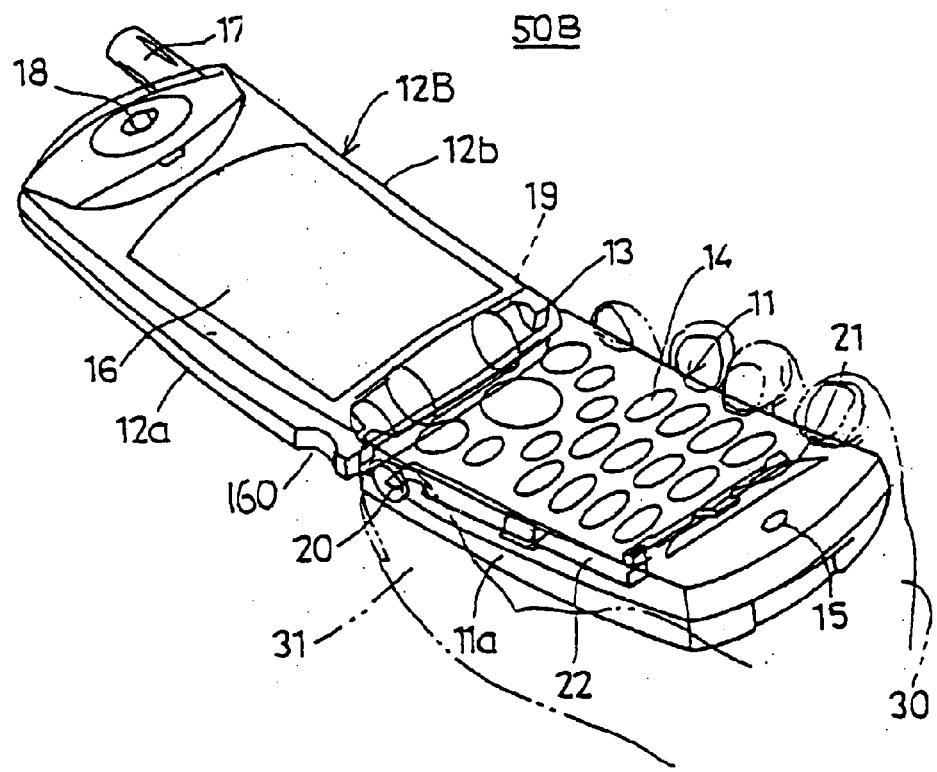

FIGS. 16A and 16B are diagrams showing a foldaway portable communications device 50B according to a third embodiment of the present invention, in a folded position and an unfolded position, respectively.

As shown in the diagrams, the chief difference between the portable communications device 50 according to the first embodiment and the portable communications device 50B according to the third embodiment is that the latter is that a portion of a lateral surface 12a of the display cover unit 12B adjacent a lock release button 20 is notched so as to form a concavity 160 thereat.

FIG. 16A shows the portable communications device 50B in a folded position. The double dot and chain line shows the outline of the left hand 30, with which the user supports the portable communications device 50B and which, by using the thumb 31 of the left hand, the user releases the lock and opens the portable communications device 50B. FIG. 16B shows the portable communications device 50B in an unfolded position.

It should be noted that the key pad base unit 11 has a width in the vicinity of the lock release button 20 that is greater than a corresponding width of the display cover unit 12B.

It will be appreciated that the concavity 160 is formed near the lock release button 20, so when the user presses the button 20 with the left thumb 31 that part of the thumb 31 that exceeds the dimensions of the button 20 merely enters the interior of the concavity 160 instead, without contacting the display cover unit 12B. Accordingly, the display cover unit 12B swings open smoothly, without being hampered by contact with the user's thumb 31.

A description will now be given of a variation of a lock mechanism and lock release mechanism.

Figure 17A:
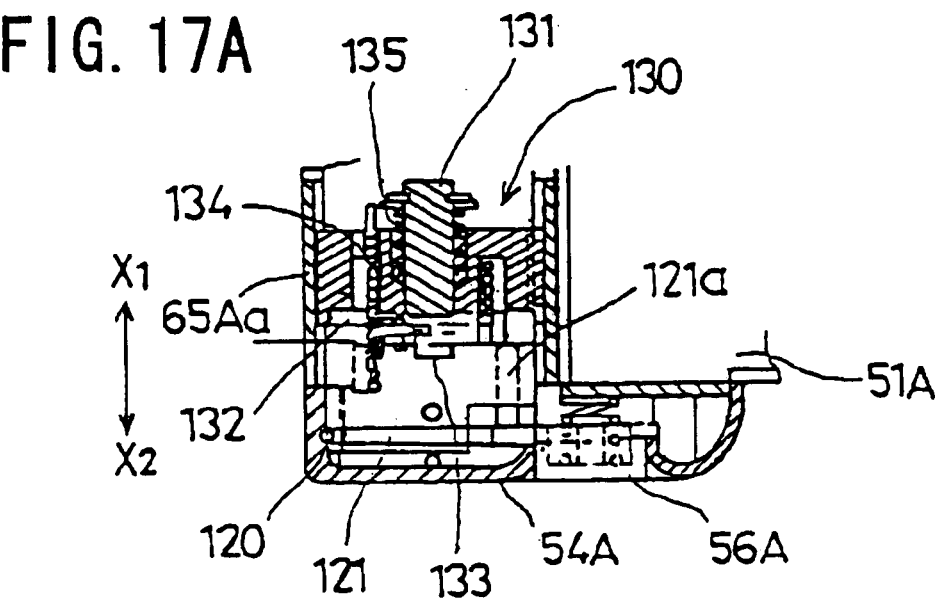
FIGS. 17A and 17B are diagrams showing a variation of a lock mechanism and a lock release mechanism.
Figure 17B:
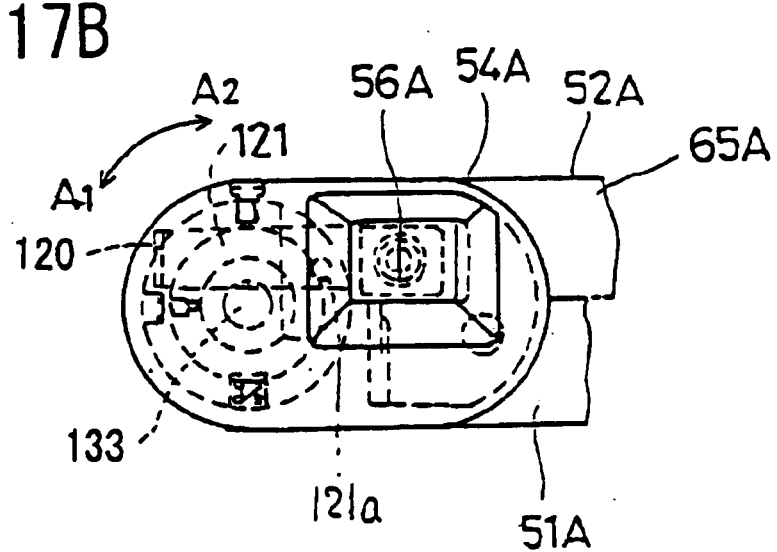

FIGS. 17A and 17B are diagrams showing a variation of a lock mechanism and lock release mechanism.

As shown in the drawings, the lock release button 56A is provided at a tip of an arm 121, one end of which is supported by a shaft 120. A pin 121a projects from an intermediate portion of the arm 121. The arm 121 and the lock release button 56A is contained within an interior space of the guard portion 54A.

Additionally, a cylindrical hinge module 130 is contained within a cylindrical portion 65Aa of the housing 65A of the display cover unit 52A. The hinge module 130 comprises a shaft 131, a disk 132 rotatably supported by the shaft 131 in such a way as to be movable in an axial direction, a lock 133 that locks the disk 132 to the shaft 131, a torsion coil spring 134 that impels the disk 132 in the A1 direction with respect to the shaft 131, and a spring 135 that impels the disk 132 in the X2 direction. The shaft 131 is fixedly mounted to the key pad base unit 51A. The disk 132 is accommodated within the interior of the cylindrical portion 65Aa in such a way as to be integrally rotatable in the A1–A2 direction and movable in the X1, X2 direction.

When the lock release button 56A is pressed, the pin 121a pushes the disk 132 in the X1 direction, the lock 133 is released, the torsion coil spring 134 rotates the disk 131 in the A1 direction and the display cover unit 52A is rotated in the identical A1 direction.

Using the principle of the lever, the force with which the pin 121a pushes the disk 132 is increased over the force with which the user presses the lock release button 56A. Accordingly, a minimal amount of force is sufficient to press the lock release button 56A and thereby release the lock 133.

A description will now be given of a variation of the coaxial-type flexible cable 100 that forms the loop 101 described above.

Figure 18A:
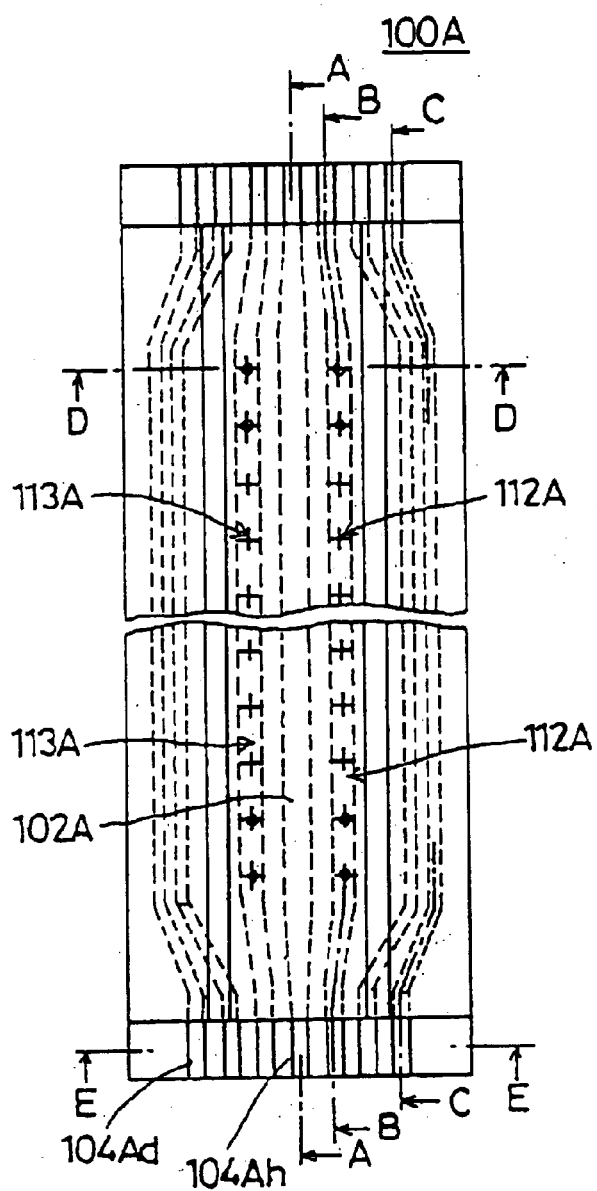
FIGS. 18A, 18B and 18C are diagrams showing top, side and rear views, respectively, of a first variation of the coaxial flexible cable.
Figure 18B:
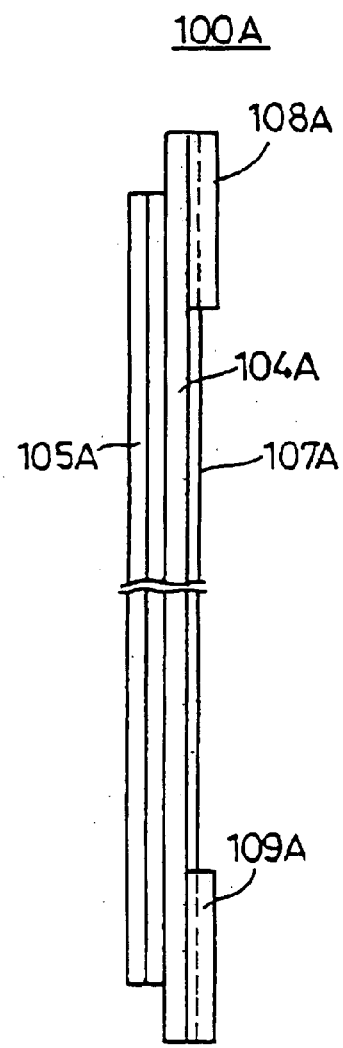
Figure 18C:
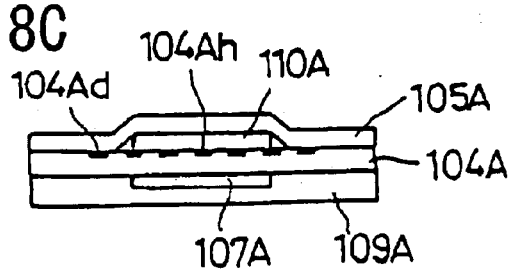
Figure 19:
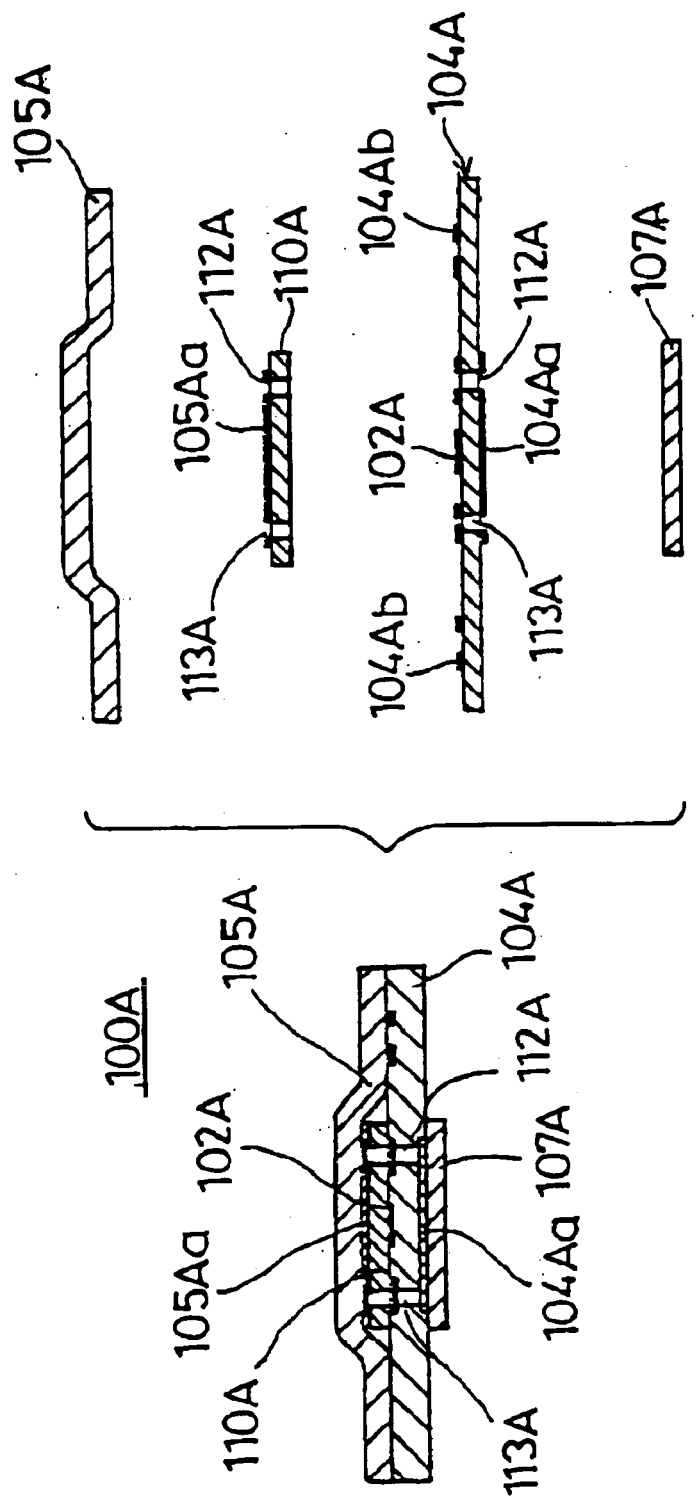
FIG. 19 is a diagram showing the structure of the coaxial flexible cable shown in FIGS. 18A, 18B and 18C.
Figure 20A:
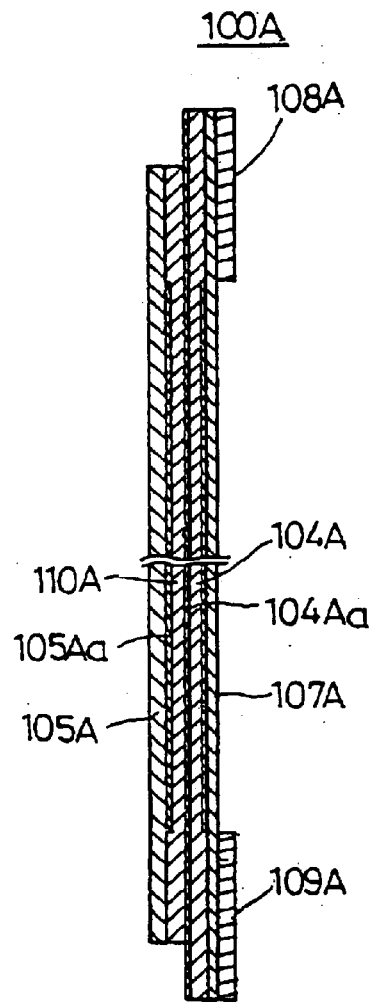
FIGS. 20A, 20B, 20C and 20D are diagrams showing cross-sectional views of the coaxial flexible cable shown in FIG. 18A along lines A, B, C and E, respectively.
Figure 20B:
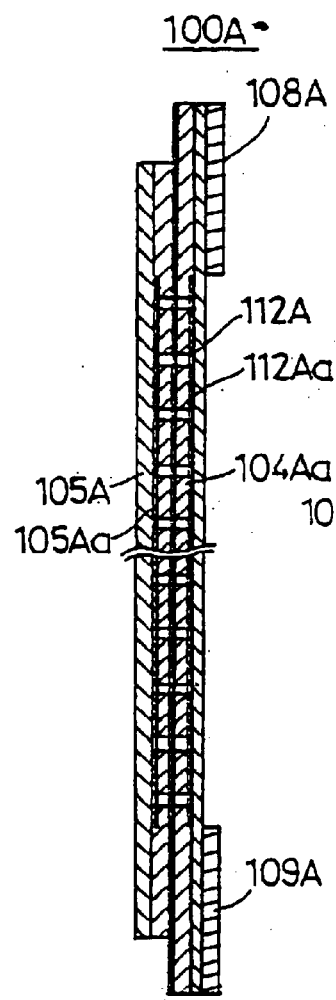
Figure 20C:
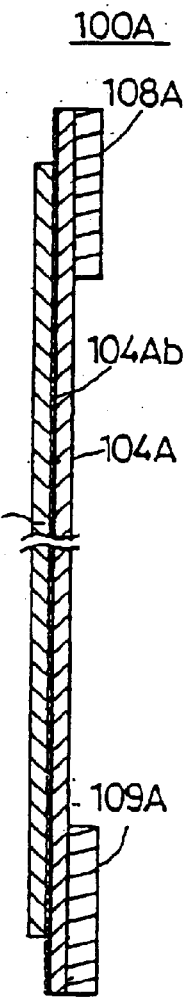
Figure 20D:
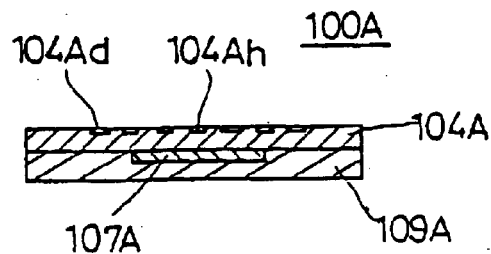

FIGS. 18A, 18B and 18C are diagrams showing top, side and rear views, respectively, of a first variation of the coaxial-type flexible cable. FIG. 19 is a diagram showing the structure of the coaxial-type flexible cable shown in FIGS. 18A, 18B and 18C. FIGS. 20A, 20B, 20C and 20D are diagrams showing cross-sectional views of the coaxial-type flexible cable shown in FIG. 18A along lines A, B, C and E, respectively.

The coaxial-type flexible cable 100A is a standard type, though without the top spacer 116 and the upper cover layer 106 of the coaxial-type flexible cable 100 described above.

The coaxial-type flexible cable 100A is constructed so that a spacer 110A is sandwiched between and enveloped by a base 104A and a top cover layer 105A. A lower cover layer 107A is provided under the base 104A, with reinforcing plates 108A, 109A provided at both sides of the lower cover layer 107A.

An inner conductor pattern 102A comprises an inner conductor. The spacer 110A and a portion of the base 104A together form an inner insulator. Ribbon patterns 105Aa, 104Aa and through-hole lines 112A, 113A together form an outer conductor. Top cover layer 105A and lower cover layer 107A together form an outer insulator.

As a result, the coaxial-type flexible cable 100A as described above has a simple construction and has the same effect as that of the coaxial-type flexible cable as shown in FIG. 12A.

A description will now be given of a second variation of the coaxial-type flexible cable.

Figure 21A:
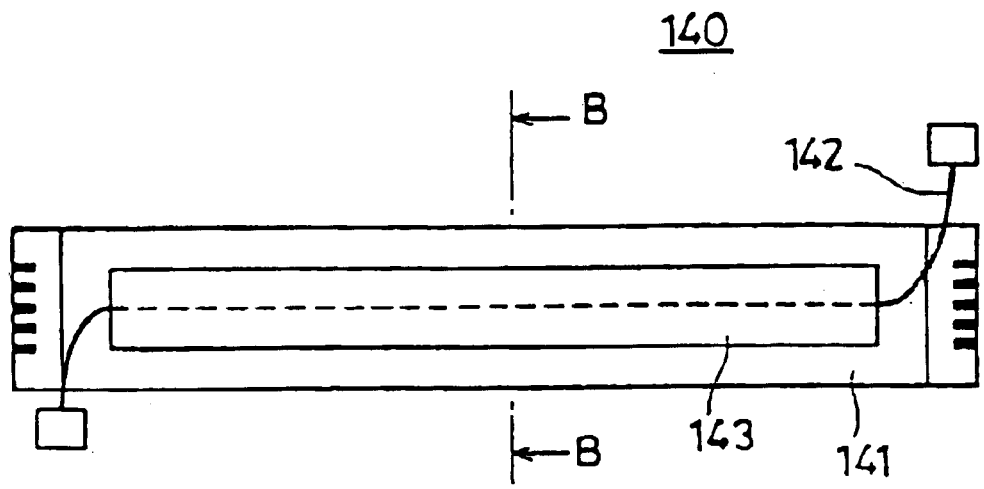
FIGS. 21A and 21B are diagrams showing a side and an expanded cross-sectional view along a line B—B, respectively, of the second variation of the coaxial flexible cable.
Figure 21B:
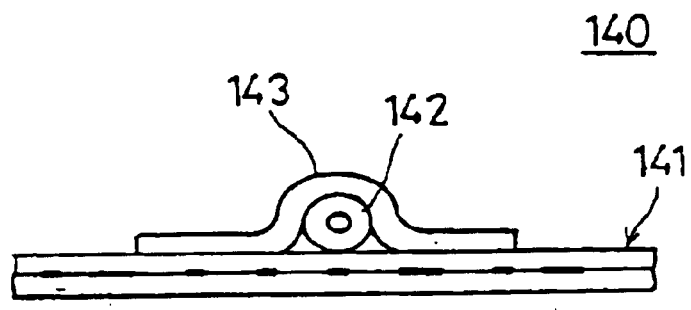

FIGS. 21A and 21B are diagrams showing a side and an expanded cross-sectional view along a line B—B, respectively, of the second variation of the coaxial flexible cable 140.

As shown in the diagram, the coaxial flexible cable 140 is constructed so that a narrow coaxial cable 142 having a diameter of approximately 1 mm is laid along a longitudinal center of a top surface of a flexible cable 141, the coaxial cable 142 being fixedly mounted on the flexible cable 141 using adhesive tape 143. The coaxial flexible cable 140, as with the coaxial flexible cable 100 described above, is formed into a loop 101 and inserted in the portable communications device.

As a result, the coaxial-type flexible cable 140 as described above has a construction that uses an ordinary flexible cable 141, and has the same effect as that of the coaxial-type flexible cable 100 shown in FIG. 12A.

It should be noted that the above-described coaxial cable 142 may alone be formed into the loop 101 and in such a state inserted in the portable communications device.

Additionally, it should be noted that, although the embodiments described above pertain to a portable communications device, the invention is not limited to such devices but is applicable to any electronic device capable of sending and receiving email, for example, or to an electronic notebook.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 11-298803, filed on Oct. 20, 1999, the entire contents of which are hereby incorporated by reference.

What is claimed is:

1. A foldaway electronic device comprising:
   a base unit having opposing lateral surfaces and an end portion;
   a cover unit having opposing lateral surfaces, each of which corresponds to one of the lateral surfaces of the base unit, and an end portion that is rotatably attached to the end portion of the base unit, whereby the cover unit may be rotated between a folded position relative to the base unit and an unfolded position relative to the base unit; and
   a flexible cable extending between the base unit and the cover unit via the respective end portions thereof,
   the flexible cable having a flexible base, a conductor pattern forming an inner conductor and a conductor pattern forming an outer conductor, the conductor patterns being added to a signal transmission pattern atop the flexible base, a portion of the flexible base being disposed between the conductor pattern that forms the inner conductor and the conductor pattern that forms the outer conductor so as to form an inner insulator.

* * * * *